US012808569B2

(12) United States Patent
Andvik et al.

(10) Patent No.: US 12,808,569 B2
(45) Date of Patent: Nov. 24, 2026

(54) VENT WITH INVERSION PROTECTION

(71) Applicant: Donaldson Company, Inc., Bloomington, MN (US)

(72) Inventors: Marc J. Andvik, Bloomington, MN (US); Matthew P. Brownson, Stillwater, MN (US); Scott A. Betcher, Lakeville, MN (US); Michael S. Libbey, Edina, MN (US); Aflal Rahmathullah, Savage, MN (US); Robert L. Dahlstrom, Cottage Grove, MN (US); Shane B. Campbell, Salt Lake City, UT (US)

(73) Assignee: Donaldson Company, Inc., Bloomington, MN (US)

( * ) Notice: Subject to any disclaimer, the term of this patent is extended or adjusted under 35 U.S.C. 154(b) by 748 days.

(21) Appl. No.: 18/205,134

(22) Filed: Jun. 2, 2023

(65) Prior Publication Data

US 2023/0392818 A1 Dec. 7, 2023

Related U.S. Application Data

(60) Provisional application No. 63/409,342, filed on Sep. 23, 2022, provisional application No. 63/348,910, filed on Jun. 3, 2022.

(51) Int. Cl.
*F24F 13/02* (2006.01)
*B01D 46/42* (2006.01)
(Continued)

(52) U.S. Cl.
CPC ...... *F24F 13/0236* (2013.01); *B01D 46/4272* (2013.01); *F01M 13/0011* (2013.01);
(Continued)

(58) Field of Classification Search
CPC .................. F24F 13/0236; F24F 8/108; B60K 2015/03447; B60K 2015/0358;
(Continued)

(56) References Cited

U.S. PATENT DOCUMENTS 4,676,390 A 6/1987 Harris
6,644,515 B1 11/2003 Campbell
(Continued)

FOREIGN PATENT DOCUMENTS

CA 2919074 C 1/2019
CN 203189747 U 9/2013
(Continued)

OTHER PUBLICATIONS

International Search Report and Written Opinion in PCT/US2023/024287, mailed Sep. 15, 2023, 6 pages.

*Primary Examiner* — Robert Clemente
(74) *Attorney, Agent, or Firm* — Mueting Raasch Group

(57) ABSTRACT

A vent assembly has a vent housing having a first axial end, a second axial end, and an airflow pathway extending between the first axial end and the second axial end. An environmental opening is towards the second axial end configured for fluid communication between an outside environment and an airflow pathway. An enclosure opening is configured to selectively define a fluid flow pathway between an interior of an enclosure and the airflow pathway. The vent assembly has an obstruction having a first relative position and a second relative position. The obstruction is configured to obstruct the fluid flow pathway in the first relative position and unobstruct the fluid flow pathway in the second relative position. Filter media is disposed in the vent housing laterally across the airflow pathway.

19 Claims, 7 Drawing Sheets

(51) Int. Cl.

| | |
|---|---|
| ***B60K 15/035*** | (2006.01) |
| ***F01M 13/00*** | (2006.01) |
| ***F16K 24/04*** | (2006.01) |
| ***F24F 8/108*** | (2021.01) |

(52) U.S. Cl.
CPC ......... *F01M 13/0033* (2013.01); *F16K 24/04* (2013.01); *F24F 8/108* (2021.01); *B60K 2015/0358* (2013.01)

(58) Field of Classification Search
CPC ....... B60K 2015/0451; F01M 13/0011; F01M 13/0033; F16K 24/04; B01D 46/003; B01D 46/0031; B01D 46/4272
See application file for complete search history.

(56) References Cited

U.S. PATENT DOCUMENTS

| | | | |
|---|---|---|---|
| 11,077,748 | B2 | 8/2021 | Hebert et al. |
| 2016/0031617 | A1 | 2/2016 | Faucheaux et al. |
| 2017/0335986 | A1 | 11/2017 | Mitchell |
| 2020/0180830 | A1 | 6/2020 | Niver |
| 2022/0112962 | A1 | 4/2022 | Dotzler et al. |

FOREIGN PATENT DOCUMENTS

| | | | |
|---|---|---|---|
| DE | 102006050720 | A1 | 5/2008 |
| DE | 102019005135 | A1 | 2/2020 |
| DE | 202019004792 | U1 | 4/2021 |
| EP | 1099644 | B1 | 5/2004 |
| GB | 1336795 | A | 11/1973 |
| WO | 2023235562 | A1 | 12/2023 |

VENT WITH INVERSION PROTECTION

RELATED APPLICATIONS

This application claims the benefit of U.S. Provisional Patent Application Ser. No. 63/348,910, filed Jun. 3, 2022, and of U.S. Provisional Patent Application Ser. No. 63/409,342, filed Sep. 23, 2022, the disclosures of which are incorporated herein by reference in their entireties.

TECHNOLOGICAL FIELD

The present disclosure is generally related to an enclosure vent. More particularly, the present disclosure is related to a vent with inversion protection.

SUMMARY

Some embodiments of the technology disclosed herein relate to a vent assembly. The vent assembly has a vent housing having a first axial end, a second axial end, and an airflow pathway extending between the first axial end and the second axial end. An environmental opening is towards the second axial end configured for fluid communication between an outside environment and an airflow pathway. An enclosure opening is configured to selectively define a fluid flow pathway between an interior of an enclosure and the airflow pathway. The vent assembly has an obstruction having a first relative position and a second relative position. The obstruction is configured to obstruct the fluid flow pathway in the first relative position and unobstruct the fluid flow pathway in the second relative position. Filter media is disposed in the vent housing laterally across the airflow pathway.

In some such embodiments, the vent housing has an inner housing and an outer housing surrounding the inner housing, where the inner housing is translatable relative to the outer housing. Additionally or alternatively, the inner housing defines the enclosure opening. Additionally or alternatively, the inner housing defines the obstruction. Additionally or alternatively, the outer housing defines the obstruction. Additionally or alternatively, the outer housing further defines a corresponding opening that aligns with the enclosure opening when the obstruction is in the second relative position and the corresponding opening does not align with the enclosure opening when the obstruction is in the first relative position.

Additionally or alternatively, the inner housing is rotatable relative to the outer housing to define the first relative position and the second relative position of the obstruction. Additionally or alternatively, the inner housing is axially translatable relative to the outer housing to define the first relative position and the second relative position of the obstruction. Additionally or alternatively, the vent assembly has a translation limiter disengageably engaging the inner housing and the outer housing. The translation limiter is configured to obstruct translation of the inner housing relative to the outer housing until manual disengagement. Additionally or alternatively, the translation limiter is a manually removable clip. Additionally or alternatively, the translation limiter is a visually distinctive color relative to the visible portions of the non-translation limiter components of the vent assembly.

Additionally or alternatively, the outer housing defines the first axial end of the housing in the first relative position of the obstruction, and the inner housing defines the first axial end of the housing in the second relative position of the obstruction. Additionally or alternatively, the outer housing has an openable seal defining the obstruction. The openable seal extends laterally across the first axial end of the vent housing in the first relative position, and the inner housing is configured to extend through the openable seal to define the first axial end of the vent housing in the second relative position. Additionally or alternatively, the outer housing includes a duckbill valve.

Additionally or alternatively, the vent housing has an axially extending sidewall surrounding the airflow pathway, wherein the vent assembly further comprises an intermediate installation seal disposed around the sidewall towards the first axial end and a final installation seal disposed around the sidewall towards the second axial end. Additionally or alternatively, the intermediate installation seal is positioned between the enclosure opening and the first axial end. Additionally or alternatively, the intermediate installation seal is disposed around the inner housing. Additionally or alternatively, the outer housing has a seal retainer, where the intermediate installation seal is outside the seal retainer in the first relative position and the intermediate installation seal is within the seal retainer in the second relative position. Additionally or alternatively, the intermediate installation seal defines the obstruction. Additionally or alternatively, the intermediate installation seal is configured to abut the enclosure in the first relative position and is spaced from the enclosure in the second relative position. Additionally or alternatively, the enclosure opening faces the axial direction. Additionally or alternatively, the enclosure opening faces the lateral direction.

Additionally or alternatively, the enclosure opening is positioned towards the first axial end. Additionally or alternatively, the vent assembly has a membrane coupled to the vent housing between the filter media and the second axial end, wherein the membrane extends laterally across the airflow pathway. Additionally or alternatively, the vent assembly has a spacing region between the filter media and the membrane. Additionally or alternatively, the filter media includes coalescing filter media. Additionally or alternatively, the filter media includes at least 10 sheets of filter media arranged in a stack in the axial direction.

Some embodiments of the technology disclosed herein relate to a vent assembly having a vent housing configured to extend through an enclosure having a wall thickness. The vent housing has a first axial end, a second axial end, and an airflow pathway extending between the first axial end and the second axial end. An environmental opening towards the second axial end configured for fluid communication between an outside environment and the airflow pathway. An enclosure opening is configured to selectively define a fluid flow pathway between an interior of the enclosure and the airflow pathway. A first coupling structure is configured to sealably engage the enclosure in an intermediate installation position. A translation limiter is configured to obstruct translation of the vent housing relative to the enclosure in the intermediate installation position. The translation limiter is configured to be manually disengaged. Filter media is disposed in the housing laterally across the airflow pathway.

In some such embodiments the enclosure opening faces the lateral direction. Additionally or alternatively, an intermediate installation seal is disposed around the vent housing, where the intermediate installation seal is positioned between the enclosure opening and the first axial end. Additionally or alternatively, the translation limiter is a visually distinctive color relative to the visible portions of the non-translation limiter components of the vent assembly. Additionally or alternatively, the translation limiter is configured to obstruct translation of the vent housing in the axial direction. Additionally or alternatively, a enclosure sealing surface is disposed around the vent housing, where the enclosure sealing surface is positioned axially between the second axial end and the enclosure opening and the enclosure sealing surface is configured to form a seal with the enclosure in the intermediate installation position. Additionally or alternatively, the translation limiter is positioned axially between the enclosure sealing surface and the environmental opening. Additionally or alternatively, the axial distance between the intermediate installation seal and the translation limiter is greater than the axial distance between the enclosure sealing surface and the enclosure opening. Additionally or alternatively, the vent assembly has engagement threads around the vent housing extending from the enclosure sealing surface towards the intermediate installation seal, where the axial distance across the engagement threads is greater than the axial distance between the intermediate installation seal and the enclosure opening.

Additionally or alternatively, the vent assembly has a snap fit connector configured to engage an enclosure via an interference fit. Additionally or alternatively, the axial distance between the intermediate installation seal and the enclosure opening is configured to be less than the wall thickness of the enclosure. Additionally or alternatively, the translation limiter is configured to prevent rotation of the vent housing relative to an enclosure. Additionally or alternatively, the enclosure opening faces the axial direction. Additionally or alternatively, the filter media is configured to be positioned within the enclosure. Additionally or alternatively, the vent assembly has a second coupling structure configured to be disengaged from the enclosure in the intermediate installation position and configured to sealably engage the enclosure in a complete installation position. Additionally or alternatively, the vent assembly has an obstruction, where the obstruction is configured to obstruct the fluid flow pathway in the intermediate installation position and unobstruct the fluid flow pathway in the complete installation position.

The above summary is not intended to describe each embodiment or every implementation. Rather, a more complete understanding of illustrative embodiments will become apparent and appreciated by reference to the following Detailed Description of Exemplary Aspects and claims in view of the accompanying figures of the drawing.

BRIEF DESCRIPTION OF THE DRAWINGS

The present technology may be more completely understood and appreciated in consideration of the following detailed description of various embodiments in connection with the accompanying drawings.

The figures are rendered primarily for clarity and, as a result, are not necessarily drawn to scale. Moreover, various structure/components, including but not limited to fasteners, electrical components (wiring, cables, etc.), and the like, may be shown diagrammatically or removed from some or all of the views to better illustrate aspects of the depicted embodiments, or where inclusion of such structure/components is not necessary to an understanding of the various exemplary embodiments described herein. The lack of illustration/description of such structure/components in a particular figure is, however, not to be interpreted as limiting the scope of the various embodiments in any way.

DETAILED DESCRIPTION

Figure 1:
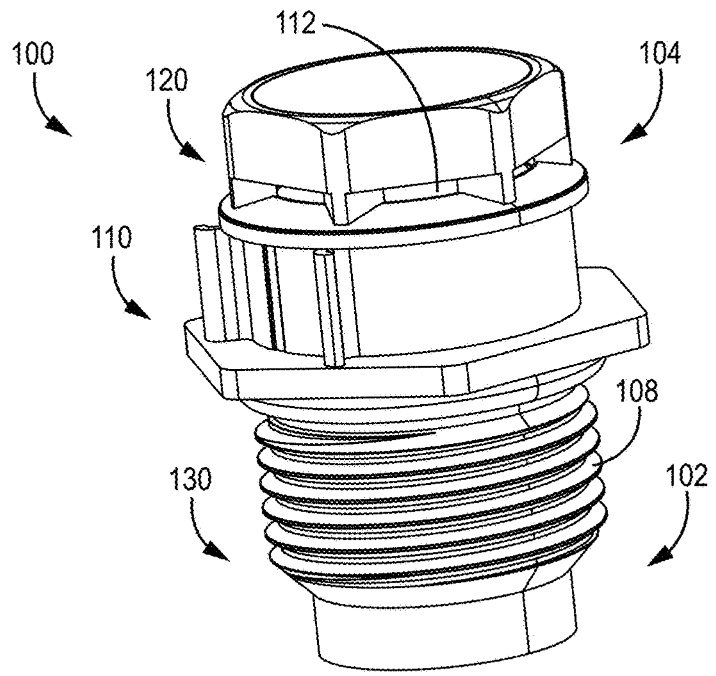
FIG. 1 is a perspective view of an example vent assembly.
Figure 2:
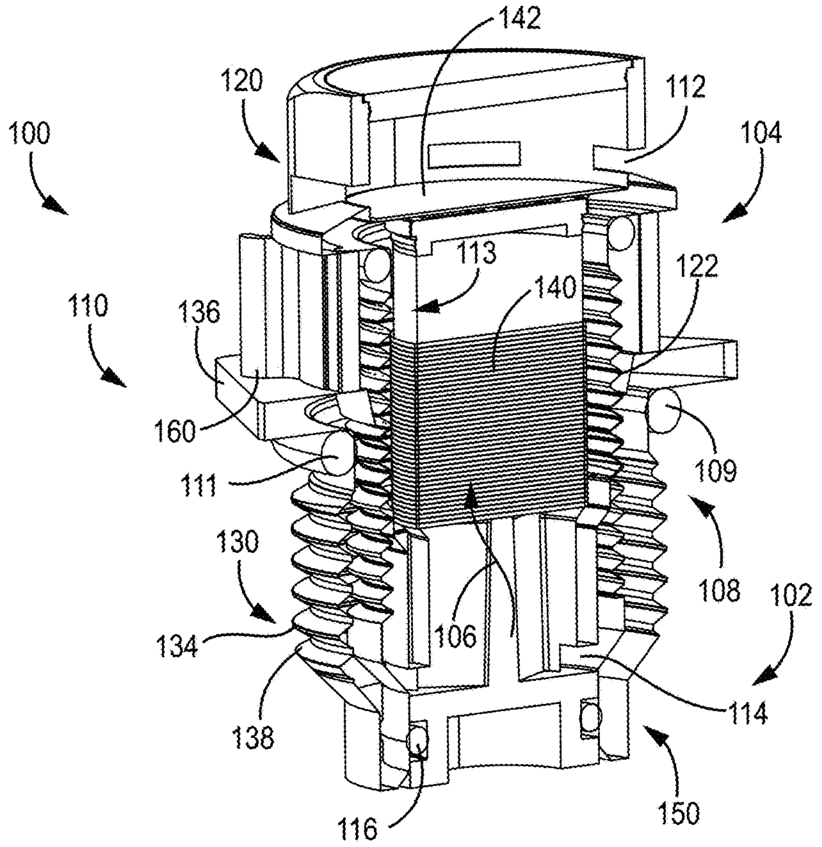
FIG. 2 is an example cross-sectional view of an example vent assembly consistent with FIG. 1.
Figure 3:
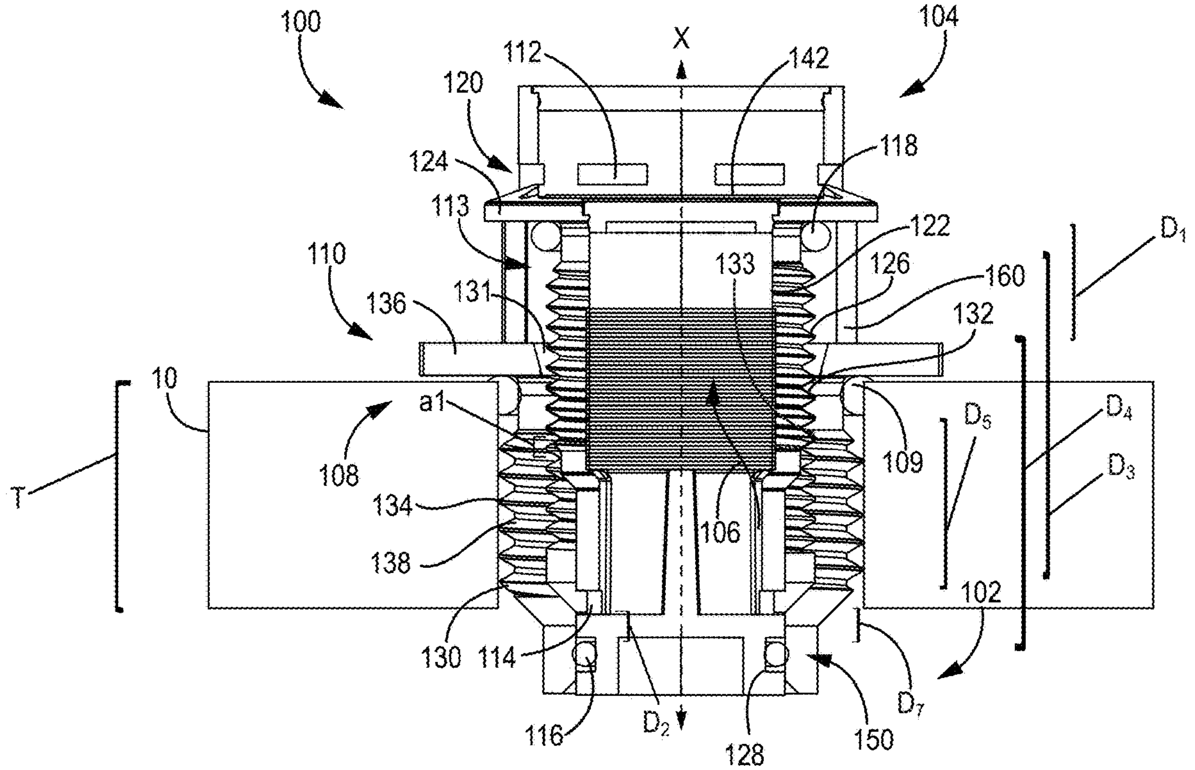
FIG. 3 is a cross-sectional view of the vent assembly of FIG. 2 in an intermediate installation position.
Figure 4:
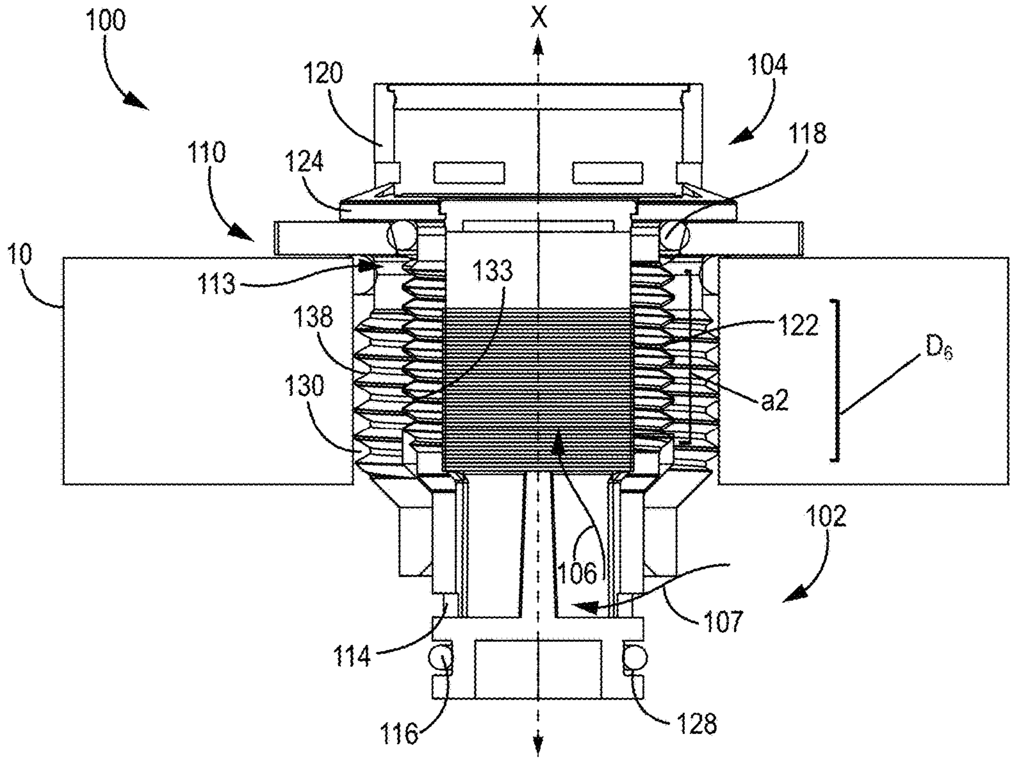
FIG. 4 is a cross-sectional view of the vent assembly of FIGS. 2-3 in a completed installation position.

FIG. 1 is a perspective view of an example vent consistent with the technology disclosed herein. FIG. 2 is a perspective cross-sectional view of a vent consistent with FIG. 1. FIG. 3 is a cross sectional view of the vent of FIG. 2 in an intermediate installation position, and FIG. 4 is a cross-sectional view of the vent of FIG. 2 in a complete installation position.

The vent assembly 100 has a vent housing 110, a first axial end 102, a second axial end 104, and an airflow pathway 106 extending between the first axial end 102 and the second axial end 104. An environmental opening 112 is defined towards the second axial end 104. The environmental opening 112 is configured for fluid communication with an outside environment. The environmental opening 112 is configured for fluid communication between the outside environment and the airflow pathway 106. The outside environment can be an environment outside of an enclosure 10, for example. The vent housing 110 defines an enclosure opening 114. The enclosure opening 114 is generally configured for selective fluid communication with an interior of an enclosure 10. The enclosure opening 114 is configured for selective fluid communication between the interior of the enclosure 10 and the airflow pathway 106. More particularly, the enclosure opening 114 is configured to selectively define a fluid flow pathway 107 (FIG. 4) between an interior of the enclosure 10 and the airflow pathway 106.

The vent housing 110 is generally configured to extend through a wall of an enclosure 10. The vent housing 110 is generally configured to be coupled to the enclosure 10. The enclosure 10 can be a fluid storage tank, in some embodiments. In some embodiments the enclosure 10 is a system housing for a vehicle, such as a crank case housing.

Filter media 140 is disposed in the vent housing 110 laterally across the airflow pathway 106. The filter media 140 is generally configured to filter airflow passing through the airflow pathway 106. In some embodiments the filter media 140 is coalescing filter media 140. In some embodiments the filter media 140 includes a breathable membrane such as a porous PTFE membrane. In some embodiments the PTFE membrane is an expanded PTFE membrane. In some embodiments the filter media 140 is arranged in a vertical stack of individual sheets of filter media 140. In some such embodiments the filter media 140 includes at least 10 sheets of filter media 140 arranged in a stack in the axial direction. In some other embodiments the filter media is not arranged in a stack. In some embodiments the filter media is a randomized mass of fibers. In some embodiments the filter media is a coiled sheet of filter media. The coiled sheet of media can be disposed around a central solid core, in some embodiments. In some embodiments the filter media is a pleated sheet of filter media. In various embodiments the airflow pathway 106 extends in the axial direction through the filter media 140.

The vent assembly 100 forms an obstruction 150. The obstruction 150 is generally configured to obstruct the enclosure opening 114 in the first relative position and unobstruct the enclosure opening 114 in the second relative position. More particularly, the obstruction 150 is generally configured to obstruct the fluid flow pathway 107 in the first relative position and unobstruct the fluid flow pathway 107 in the second relative position. In the first relative position, the obstruction 150 is generally configured to obstruct the portion of the airflow pathway 106 that extends from the outside environment to the filter media 140 via the enclosure opening 114. In the first relative position, the obstruction 150 is configured to obstruct the fluid flow pathway 107. More particularly, the obstruction 150 is configured to prevent liquid from passing to the filter media 140 from the enclosure opening 114, which may advantageously prevent fouling of the filter media 140 by the liquid. Such a configuration may advantageously allow the enclosure 10 to be inverted, such as during manufacturing operations, without fluids from the enclosure 10 entering into the vent assembly 100.

In some embodiments, when in the first relative position, the obstruction 150 can be disposed along the airflow pathway 106 (and the fluid flow pathway 107) between the enclosure opening 114 and the filter media 140. In some embodiments, such as reflected in FIGS. 1-5, the enclosure opening 114 is disposed between the filter media 140 and the obstruction 150 along the airflow pathway 106 (and the fluid flow pathway 107) in the first relative position. The first relative position can be an intermediate installation position where the vent assembly 100 is partially, and not fully, installed in an enclosure 10. It is noted that "obstructing the enclosure opening" is used herein does not require that the obstruction 150 abut the enclosure opening 114, such as reflected in FIGS. 1-4. The obstruction 150 can indirectly obstruct the enclosure opening 114 across the fluid flow pathway 107. In some other embodiments such as depicted in FIGS. 5-9, the obstruction can directly obstruct the enclosure opening, which will be discussed in more detail below.

In the second relative position of the obstruction 150, which is the "complete" installation position, the obstruction 150 clears the airflow pathway 106 to accommodate venting between the enclosure 10 and the outside environment. More particularly, the obstruction 150 clears the fluid flow pathway 107 (FIG. 4) to accommodate venting between the enclosure 10 and the outside environment. The obstruction 150 is removed from the fluid flow pathway 107 (and airflow pathway 106) to accommodate fluid flow from the first axial end 102 of the vent housing 110 towards the filter media 140. As such, the environment outside of the vent housing 110 (in particular, the environment within the enclosure 10) and the filter media 140 are in fluid communication through the enclosure opening 114. In various implementations, the vent assembly 100 is configured to remain in an upright orientation upon achieving a complete installation position (when the obstruction is in the second relative position).

In the current example, the vent housing 110 has an inner housing 120 and an outer housing 130 surrounding the inner housing 120. In various embodiments the inner housing 120 defines the second end of 104 of the assembly 100. The inner housing 120 has an inner axial sidewall 122 that extends in the axial direction around the airflow pathway 106 from the second axial end 104 of the assembly 100 towards the first axial end 102 of the assembly 100. The outer housing 130 has an outer axial sidewall 134 that extends in the axial direction between the first axial end 102 and the second axial end 104 of the assembly 100. The outer axial sidewall 134 laterally surrounds the inner axial sidewall 122.

The inner housing 120 is generally translatable relative to the outer housing 130, where "translatable" is used herein to encompass linear translation, rotational translation, and the like. In some embodiments, the outer housing is omitted. In such embodiments, the inner housing 120 is generally selectively translatable relative to the enclosure 10. In the current example, the inner housing 120 is selectively rotatable relative to the outer housing 130 and/or the enclosure 10. The inner housing 120 is selectively linearly translatable relative to the outer housing 130 and the enclosure 10. It is noted that in some other examples where the outer housing 130 is omitted, the inner housing 120 can be selectively linearly translatable relative to the enclosure 10.

The inner housing 120 can be selectively translatable between the intermediate installation position (such as depicted in FIGS. 1-3), and the complete installation position (such as depicted in FIG. 4). In the intermediate installation position, the obstruction 150 is formed across the airflow pathway 106 as discussed above. In the complete installation position, the obstruction 150 is clear of the airflow pathway 106 as discussed above.

Figure 7:
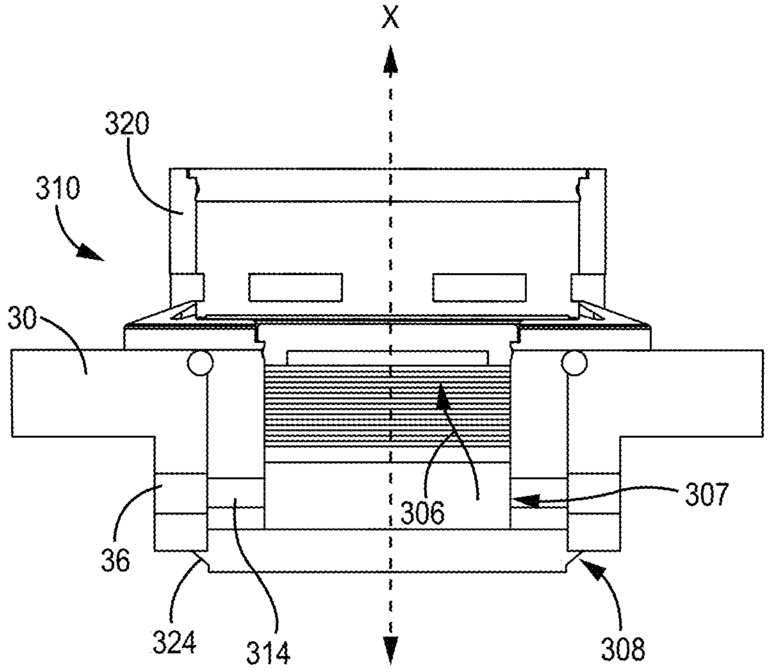
FIG. 7 is a cross-sectional view of the example vent assembly of FIG. 6 in a completed installation position.
Figure 9:
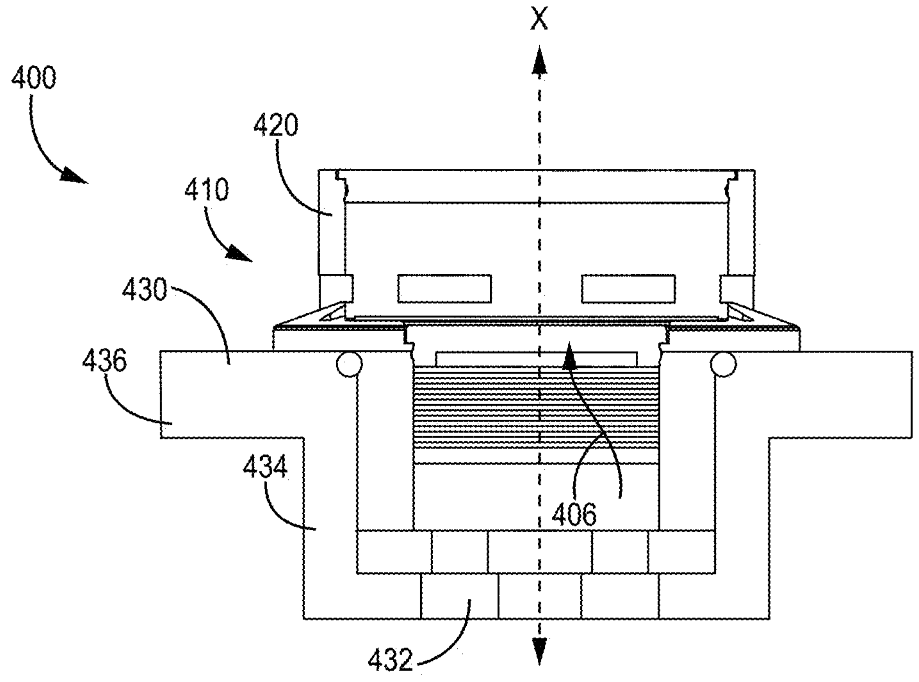
FIG. 9 is a cross-sectional view of the vent assembly of FIG. 8 in a completed installation position.
Figure 11:
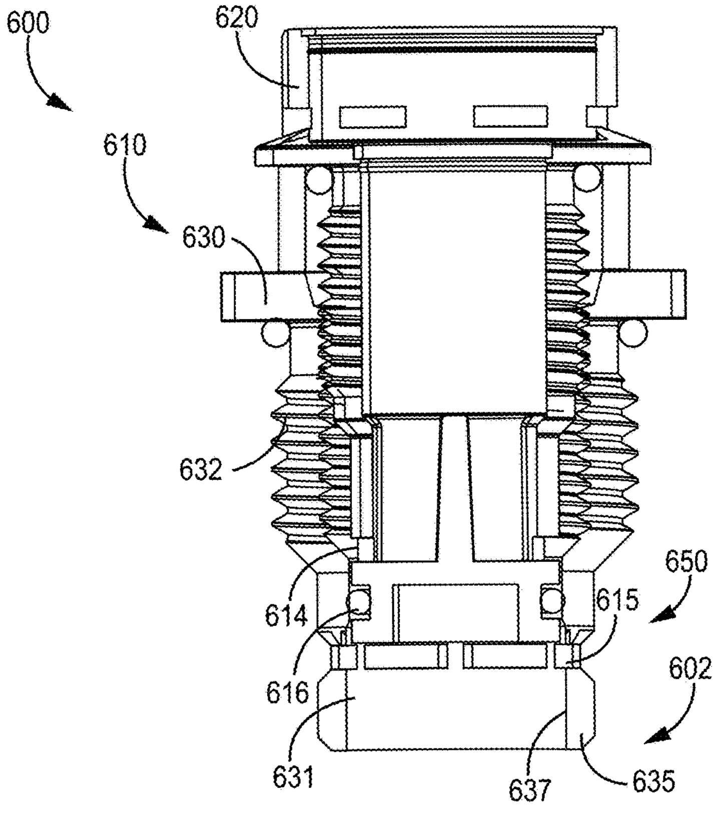
FIG. 11 is a cross-sectional view of yet another example vent assembly in an intermediate installation position consistent with the technology disclosed herein.

In the current examples depicted, the inner housing 120 defines the enclosure opening 114. In the current examples depicted, the outer housing 130 defines the obstruction 150. In some embodiments the inner housing 120 also defines the obstruction 150. In some other embodiments, such as that depicted in FIG. 5, which will be described in more detail below, only the outer housing 230 defines the obstruction 250. In various embodiments, both of the inner housing 120 and outer housing 130 define the obstruction 150, such as depicted in FIGS. 1-4. In various embodiments, the interaction between the inner housing 120 and the outer housing 130 selectively obstructs the airflow pathway 106 and clears the airflow pathway 106. In some embodiments the outer housing 130 defines the enclosure opening 114. In various embodiments, both the inner housing 120 and the outer housing 130 define the enclosure opening 114. In some other examples, the outer housing 130 (or the enclosure 10) can define a corresponding opening that aligns/overlaps with the enclosure opening 114 when the obstruction 150 is in the second relative position that is the complete installation position of the vent assembly 100 (such as depicted in FIGS. 7, 9, and 11 which will be discussed in more detail below).

In various embodiments a translation limiter 160 is configured to obstruct translation of the inner housing 120 relative to the outer housing 130 until manual disengagement. In some embodiments, such as where an outer housing 130 is omitted, the translation limiter 160 can be configured to obstruct translation of the vent housing 110 relative to the enclosure 10 in the intermediate installation position until manual disengagement. The translation limiter 160 may advantageously prevent inadvertent translation of the inner housing 120 relative to the outer housing 130 and/or the enclosure 10. The translation limiter 160 disengageably engages the inner housing 120 and the outer housing 130 (or the enclosure 10 where the outer housing 130 is omitted). The translation limiter 160 disengageably engages the inner housing 120 and the outer housing 130 in the first relative position.

In the example of FIGS. 1-4, the inner housing 120 is selectively axially translatable relative to the outer housing 130 to define the first relative position of the obstruction 150 (the intermediate installation position) and the second relative position (the complete installation position) of the obstruction 150. In such examples the translation limiter 160 is configured to prevent axial translation of the inner housing 120 relative to the outer housing 130. In some examples the inner housing 120 is rotatable relative to the outer housing 130 to define the first relative position and the second relative position of the obstruction 150. In such examples the translation limiter 160 is configured to prevent rotational translation of the inner housing 120 relative to the outer housing 130 and/or the enclosure 10. In some embodiments where the inner housing is rotatable relative to the outer housing, the inner housing 120 is not axially translatable relative to the outer housing, meaning that the inner housing has a fixed position in the axial direction relative to the outer housing.

In the examples of FIGS. 1-4, the translation limiter 160 is a manually removable clip that selectively fixes the position of the inner housing 120 relative to the outer housing 130 to prevent complete installation of the vent assembly 100 to the enclosure 10. In the current example, the translation limiter 160 extends perimetrically around at least a portion of the inner housing 120. The clip can frictionally engage the inner housing 120, in some embodiments. In some embodiments the translation limiter 160 is a molded component disposed completely around the vent housing 110, where the molded component has a weakened region(s) that is configured to be torn by a user to remove the molded component from the vent assembly 100. In the examples of FIGS. 1-5, the translation limiter 160 is positioned between the inner housing 120 and the outer housing 130 in the axial direction and prevents axial translation of the inner housing 120 towards the outer housing 130 in the axial direction. More particularly, the translation limiter 160 obstructs the linear translation pathway of the inner housing 120 towards the outer housing 130. In the current example, the translation limiter 160 is positioned axially between a final installation seal 118 coupled to the inner housing 120 and the enclosure opening 114.

In some embodiments the translation limiter 160 is another mechanism that selectively fixes the position of the inner housing 120 relative to the outer housing 130 (or the enclosure 10 itself where an outer housing 130 is omitted) to prevent complete installation of the vent assembly 100 to the enclosure 10. For example, the vent assembly 100 can have a translation limiter that incorporates the functionality of safety caps such as press-and-screw caps, squeeze lock caps, push-down-and-turn caps, and the like. In such embodiments the inner housing 120 can be rotatable relative to the enclosure 10 and/or the outer housing 130 in the intermediate installation position, but is fixed in the axial direction relative to the enclosure 10 and/or outer housing 130 until the safety cap function is engaged (such as by pressing and screwing the inner housing 120. In these types of examples, the translation limiter 160 fixes the axial position of the inner housing 120 but does not necessarily fix the angular position of the inner housing 120 relative to the enclosure 10 and/or the outer housing 130.

In some embodiments the translation limiter 160 has a visually distinctive color compared to the visible portions of the non-translation limiter components of the vent assembly 100 to visually indicate that the vent assembly 100 is in an intermediate installation position. The "visible portions of the non-translation limiter components of the vent assembly" are the areas of the vent assembly 100 configured to be positioned outside an enclosure that are in direct contact with the environment outside of the enclosure when the vent assembly 100 is in an intermediate installation position. In some embodiments the translation limiter 160 is a relatively vibrant color and the other components of the vent assembly 100 are a relatively dull color. For example, the translation limiter 160 can be a color such as red, orange or yellow, while the other components of the vent assembly 100 can be another color such as brown, black, or gray. In some embodiments the translation limiter 160 can be a fluorescent color while the other components of the vent assembly 100 can be a non-fluorescent color.

Figure 5:
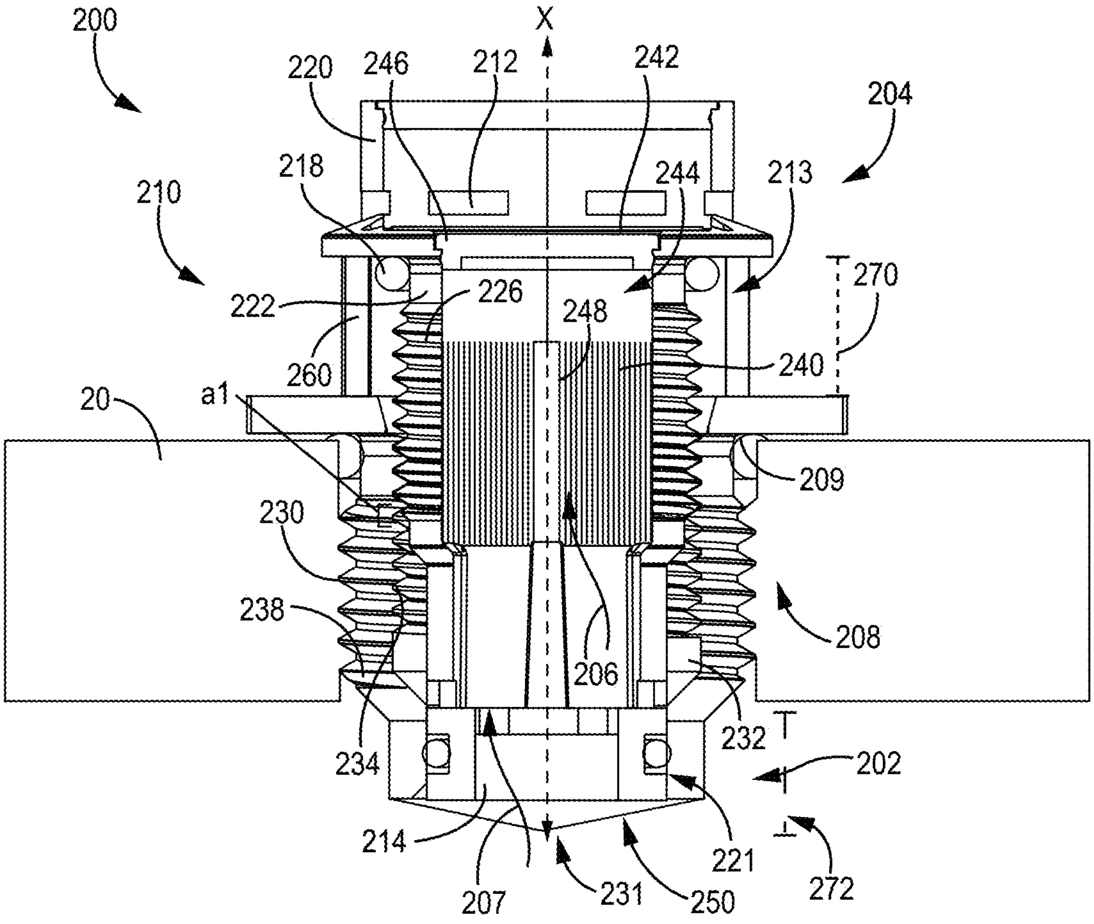
FIG. 5 is a cross-sectional view of yet another example vent assembly in an intermediate installation position.

In various examples, the outer housing 130 defines the first axial end 102 of the vent housing 110 in the first relative position of the obstruction 150 (the first intermediate installation position of the vent assembly 100), which is visible in FIGS. 3 and 5. In the particular example of FIG. 3, the inner housing 120 also defines the first axial end 102 of the vent housing 110, while in other examples discussed below, the inner housing does not define the first axial end of the vent housing. In the second relative position of the obstruction 150 of FIG. 4, the inner housing 120 defines the first axial end 102 of the vent housing 110 and the outer housing 130 does not define the first axial end 102 of the vent housing 110. In the FIG. 3 example, the outer axial sidewall 134 laterally surrounding the inner housing 120 to form a seal with the inner housing 120 that forms the obstruction 150 across the airflow pathway 106 in the first relative position (the intermediate installation position). In the second relative position (the complete installation position), the inner housing 120 has been translated in the axial direction such that the first axial end of the inner housing 120 advances beyond the first axial end of the outer housing 130. More particularly, an outer housing cavity 131 defined by the outer housing 130 extends through the first axial end of the outer housing 130. The inner housing 120 is configured to be translated axially through the outer housing cavity 131, beyond the first axial end of the outer housing 130.

In various examples, such as those consistent with FIGS. 1-4, the vent housing 110 has an axially extending sidewall, which is the inner axial sidewall 122 surrounding the airflow pathway 106. An intermediate installation seal 116 is disposed around the inner axial sidewall 122 towards the first axial end 102. The intermediate installation seal 116 is positioned between the enclosure opening 114 and the first axial end 102 of the vent housing 110. In the current example, the intermediate installation seal 116 is a component of the obstruction 150. As such, in the first relative position, the intermediate installation seal 116 is sealably disposed radially between the outer housing 130 and the inner housing 120 to prevent fluid communication between the enclosure 10 and the filter media 140 through the enclosure opening 114. In particular, the intermediate installation seal 116 obstructs the fluid flow pathway 107. In the second relative position of the obstruction 150, the intermediate installation seal 116 does not abut the outer housing 130 and does not form a seal between the inner housing 120 and the outer housing 130. As such, in the second relative position, the intermediate installation seal clears the fluid flow pathway 107. In some embodiments where the vent assembly 100 lacks an outer housing 130, the intermediate installation seal 116 is configured to abut the enclosure 10 in the first relative position and does not abut the enclosure 10 in the second relative position.

While in FIGS. 2-4 the intermediate installation seal 116 is depicted as coupled to the inner housing 120 and disposed in a seal receptacle 128 defined by the inner housing 120, in some embodiments the intermediate installation seal 116 can be coupled to the outer housing 130. In such examples the outer housing 130 can define a seal receptacle that is configured to receive the intermediate installation seal 116. In such an example, in the first relative position, the intermediate installation seal 116 is sealably disposed radially between the outer housing 130 and the inner housing 120 to prevent fluid communication between the enclosure 10 and the filter media 140 through the enclosure opening 114, as discussed above. In the second relative position, the intermediate installation seal 116 continues to abut the outer housing 130 but no longer forms a seal between the inner housing 120 and the outer housing 130. At least portions of the intermediate installation seal 116 would not abut the inner housing 120. In some embodiments where the vent assembly 100 lacks an outer housing 130, the intermediate installation seal 116 is configured to be coupled to the enclosure 10 about the vent opening in the enclosure 10 to form a seal between the vent assembly 100 and the enclosure in the first relative position (the intermediate installation position) and does not form a seal between the enclosure 10 and the vent assembly 100 in the second relative position (the complete installation position).

In some examples, a second seal, which can be referred to as a final installation seal 118, is disposed around the inner axial sidewall 122 towards the second axial end 104. The final installation seal 118 is coupled to the inner housing 120 and abuts a second retaining rim 124 of the inner housing 120, where the second retaining rim 124 extends radially outward from the inner axial sidewall 122. In some embodiments, the final installation seal 118 does not abut the outer housing 130 or the enclosure 10 when the obstruction 150 is in the first relative position. In such embodiments, the final installation seal 118 is configured to abut the outer housing 130, when the obstruction 150 is in the second relative position, which is depicted in FIG. 4. In the second relative position the final installation seal 118 is sealably disposed between the outer housing 130 and the inner housing 120. In embodiments where an outer housing 130 is omitted, the final installation seal 118 can be configured to form a seal between the enclosure 10 and the inner housing 120 in the second relative position. In such embodiments, the final installation seal 118 does not abut the enclosure 10 in the first relative position of the obstruction 150.

In the current example, the enclosure opening 114 faces the lateral direction. In some other embodiments, such as those depicted in FIGS. 5, and 8-9, the enclosure opening 114 faces the axial direction. In some embodiments the enclosure opening 114 is positioned towards the first axial end 102 of the vent housing 110.

In some embodiments the vent assembly 100 has a membrane 142 coupled to the vent housing 110 between the filter media 140 and the second axial end 104. The membrane 142 extends laterally across the airflow pathway 106. In some such embodiments there is a spacing region between the filter media 140 and the membrane 142 that is a gap in the axial direction. In some embodiments at least a portion of the filter media 140 is configured to be positioned within the enclosure 10 when the vent assembly 100 is in a complete installation position.

The vent assembly 100 has a first coupling structure 108 that is configured to sealably engage the enclosure 10 in the intermediate installation position. The first coupling structure 108 includes the intermediate installation seal 116, discussed in detail above. In the current example, the first coupling structure 108 includes screw threading 138, or engagement threads 138, defined by the outer housing 130 that is configured to mutually engage with mating threads of the enclosure 10. In some embodiments the first coupling structure 108 can include a snap fit connector between the outer housing 130 and the enclosure 10 as an alternative to the screw threading 138. The snap fit connector can be configured to form an interference fit between the enclosure 10 housing and the vent assembly 100. In some embodiments the enclosure 10 housing and the outer housing 130 define a mating bayonet connection. In some embodiments the outer housing 130 and the enclosure 10 can be coupled through a weld, fasteners such as bolts or screws, or through adhesive, as examples.

In examples the first coupling structure 108 can include an enclosure sealing surface 109 that is configured to form a seal between the enclosure 10 and the vent assembly 100 in the intermediate installation position. The enclosure sealing surface 109 can be configured to form a seal between the enclosure 10 and the vent assembly 100 in the complete installation position, in some embodiments. In various embodiments, a sealing material 111 such as an o-ring, gasket, or another sealing material is configured to be disposed between the enclosure sealing surface 109 and the enclosure 10 to form a seal. The sealing material can be a component of the vent assembly 100, in some other embodiments the sealing material can be a component of the enclosure 10, and in yet other embodiments the sealing material is a separate component from the enclosure and the vent assembly 100.

In the current example, the first coupling structure 108 includes a first retaining rim 136 that is a component of the outer housing 130. The first retaining rim 136 extends radially outward from the outer axial sidewall 132. The first retaining rim 136 is generally configured to prevent the vent assembly 100 from translating into the enclosure beyond a particular axial position relative to the enclosure 10. In some embodiments the first retaining rim 136 is configured to abut an outer surface of the enclosure 10 in the intermediate installation position. The enclosure sealing surface 109 extends around the outer axial sidewall 134. The enclosure sealing surface 109 is defined by the retaining rim 136 and the outer axial sidewall 134, in the current example. In some embodiments the first coupling structure 108 can additionally or alternatively includes fasteners that are configured to engage the outer housing 130 to the enclosure 10. For example, the enclosure 10 can define fastener openings that align with fastener openings defined by the outer housing 130 where the fastener openings are configured to engage fasteners such as bolts or screws, as examples.

In the current example, the first coupling structure 108 includes mating threads 126, 133 of the inner housing 120 and the outer housing 130, respectively. In an intermediate installation position, a first axial length a1 (visible in FIG. 3) that is a portion of the full axial length of outer circumferential threads 126 of the inner housing 120 engages the inner circumferential threads 133 of the outer housing 130. The inner housing 120 can be inserted into the outer housing 130 and rotated to engage the first axial length a1 of the outer circumferential threads 126 and the inner circumferential threads 133.

In some embodiments the vent assembly 100 has a second coupling structure 113 that is configured to be disengaged from the enclosure 10 in the intermediate installation position (FIGS. 2-3) and configured to engage the enclosure 10 in a complete installation position (FIG. 4). The second coupling structure 113 can include the final installation seal 118 depicted in FIGS. 1-4, for example. In the intermediate installation position, the final installation seal 118 is considered to be disengaged from the enclosure 10 because it does not form a seal with the enclosure 10. In the intermediate installation position, the first retaining rim 136 is spaced from the second retaining rim 124 by a first axial distance $D_1$ that is, in the current example, is the axial length of the translation limiter 160. Similarly, the final installation seal 118 is spaced from the first retaining rim 136 by approximately the first axial distance $D_1$. The translation limiter 160 is configured to be removed to axially translate the inner housing 120 relative to the outer housing 130 to achieve the complete installation position.

In the complete installation position, the final installation seal 118 is considered to engage the enclosure 10 by forming a seal with the enclosure 10 via the outer housing 130. More particularly, the final installation seal 118 forms a seal between the first retaining rim 136 of the outer housing 130 and a second retaining rim 124 of the inner housing 120 in the final installation position. As such, in the current example, the second coupling structure 113 includes the second retaining rim 124 that is a component of the inner housing 120. The second retaining rim 124 extends radially outward from the inner axial sidewall 122. The second retaining rim 124 extends radially outward from the outer housing cavity 131 (visible in FIG. 3) defined by the outer housing 130. The second retaining rim 124 is generally configured to prevent the inner housing 120 from translating into the enclosure 10 beyond a particular axial position relative to the enclosure 10. In some embodiments the second retaining rim 124 is configured to abut an outer surface of the outer housing 130 in the complete installation position.

In the current example, the second coupling structure 113 includes a second axial length a2 (visible in FIG. 4) of the outer circumferential threads 126 that are configured to engage the inner mating threads 133 of the outer housing 130. The second axial length a2 of the outer circumferential threads 126 is greater than the first axial length a1 of the outer circumferential threads 126. In the current example, the inner housing 120 can be rotated relative to the outer housing 130 to advance the inner housing 120 in the axial direction to the complete installation position where the obstruction 150 is removed from the fluid flow pathway 107 and the final installation seal 118 forms a seal with the outer housing 130.

In embodiments where the obstruction 150 is configured to be axially translated out of obstruction with the enclosure opening 114, such as embodiments consistent with FIGS. 1-4 and embodiments where the outer housing 130 is omitted, the first axial length $D_1$ of the translation limiter 160 is greater than the axial distance $D_2$ between the intermediate installation seal 116 and the enclosure opening 114. As such, removal of the translation limiter 160 and the subsequent axial translation of the vent assembly 100 to bring the final installation seal 118 into sealing contact between the inner housing 120 and the outer housing 130 (or the inner housing 120 and the enclosure 10 where the outer housing 130 is omitted) results in the opening of the enclosure opening 114. Furthermore, in some embodiments, a axial distance D3 between the final installation seal 118 and the enclosure opening 114 is configured to be less than the wall thickness T of the enclosure 10, where the wall thickness T refers to the axial distance across the portion of the enclosure 10 wall directly adjacent to and surrounding the vent assembly 100. As such, in embodiments where the outer housing 130 is omitted, the enclosure 10 wall can form the obstruction 150 across the enclosure opening 114 while the seal also forms a portion of the obstruction 150 between the wall and the vent assembly 100.

In some embodiments, the axial distance $D_4$ between the intermediate installation seal 116 and the translation limiter 160 is greater than the axial distance $D_5$ between the enclosure sealing surface 109 and the enclosure opening 114. In some embodiments, the axial distance $D_6$ across the engagement threads 138 is greater than the axial distance $D_7$ between the intermediate installation seal and the enclosure opening.

In some embodiments where the vent assembly 100 has an inner housing 120 and an outer housing 130, the inner housing 120 can be coupled to the outer housing 130 through a variety of different approaches and combinations of approaches. The inner housing 120 and the outer housing 130 can form a snap fit connection. The inner housing 120 and the outer housing 130 can have mating bayonet connection features. As shown in FIGS. 1-4, the inner housing 120 and outer housing 130 can define mating screw threads, as has been discussed in detail, above.

Figure 12:
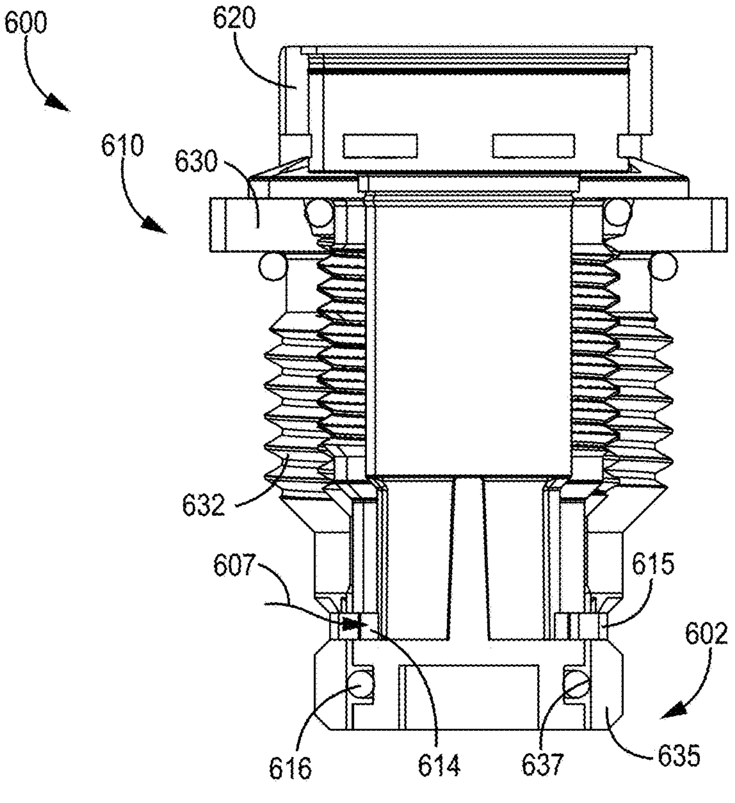
FIG. 12 is a cross-sectional view of the example vent assembly of FIG. 11 in a complete installation position.

FIG. 11 is a cross-sectional view of an alternate example vent assembly 600 to that depicted in FIGS. 1-4 and described above, where the vent assembly 600 is in an intermediate installation position. FIG. 12 is a cross-sectional view of the example vent assembly 600 in a complete installation position. The descriptions above apply to the current vent assembly 600 except where contrary to the current description or figure and the currently described vent assembly 600 has the same components as the examples discussed above—while filter media is omitted, it will be understood that the vent assembly 600 will generally incorporate filter media described elsewhere herein. In the current example, however, the outer housing 630 defines a corresponding opening 615 that overlaps with the enclosure opening 614 (defined by the inner housing 620) when the obstruction 650 is in the second relative position that is the complete installation position of the vent assembly 600. The corresponding opening 615 is a lateral opening that is configured to align in the lateral direction with the enclosure opening 614, as visible in FIG. 12. The corresponding opening 615 is a series of discrete openings defined laterally through the outer axial sidewall 632 and around the outer housing cavity 631.

Unlike the previous example depicted, in the current example both the inner housing 620 and the outer housing 630 define the first axial end 602 of the vent housing 610 in the complete installation position. Particularly, the first axial end 602 of the outer housing 630 defines a seal retainer 635. The seal retainer 635 is an annular component having an inner circumferential surface 637 that is configured to abut the intermediate installation seal 616 in the final installation position. The seal retainer 635 is generally configured to receive the intermediate installation seal 616 in the final installation position. The seal retainer 635 is configured to retain the position of the intermediate installation seal 616 relative to the inner housing 620, which may advantageously prevent the intermediate installation seal 616 from falling off of the inner housing 620. The intermediate installation seal 616 is configured to be linearly translated into the seal retainer 635 to the final installation position.

In the intermediate installation position, the intermediate installation seal 616 is positioned radially between and axially between the enclosure opening 614 and the corresponding opening 615 to prevent fluid communication between an enclosure and the filter media through the enclosure opening 614. In the current embodiment, in the second relative position of the obstruction 650, the intermediate installation seal 616 does abut the outer housing 630. In the second relative position of the obstruction 650, the intermediate installation seal 616 may form a seal between the inner housing 620 and the outer housing 630. However, in the second relative position, the intermediate installation seal 616 clears the fluid flow pathway 607. In some embodiments where the vent assembly 600 lacks an outer housing 630, the enclosure itself can define corresponding openings and optionally a seal retainer as discussed herein.

Figure 10:
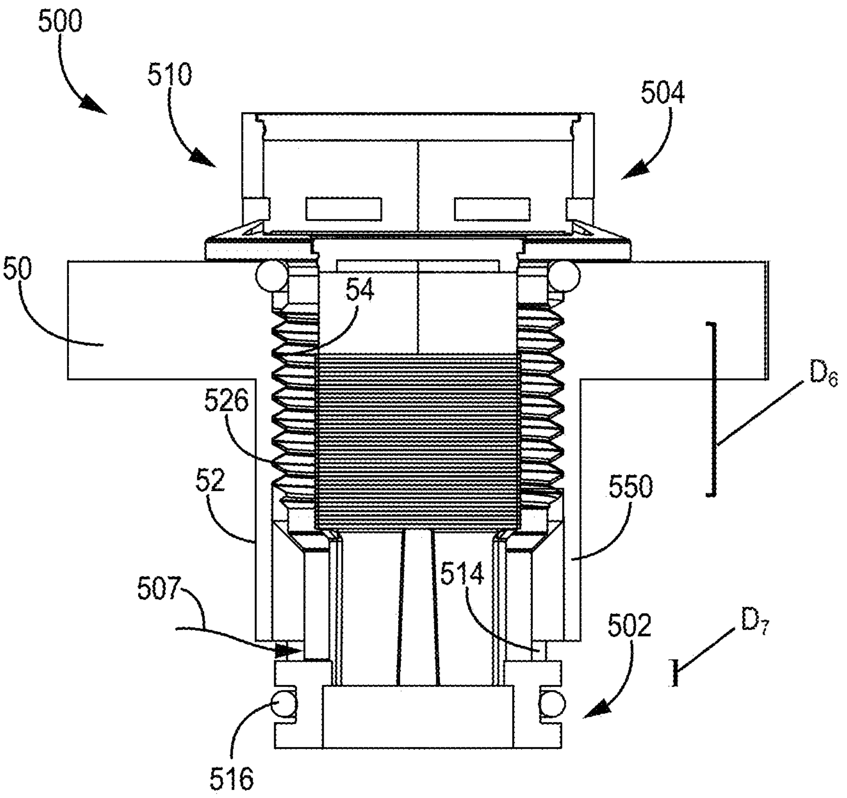
FIG. 10 is a cross-sectional view of yet another example vent assembly consistent with the technology disclosed herein.

FIG. 10 shows a cross-sectional view of an alternate example vent assembly 500 that has a vent housing 510 that is a singular component. The vent assembly 500 is in a complete installation position. More particularly, an outer housing is omitted. The vent housing 510 is configured consistently with the inner housing described above with reference to FIGS. 1-4 and, as such, the above description of the inner housing generally applies to the vent housing 510 of the current example unless contrary to the current description and figure. In this example the vent housing 510 is configured to be directly coupled to the enclosure 50 in the intermediate installation position and the complete installation position. The enclosure 50 defines an axially extending sidewall 52 surrounding the vent housing 510. The axially extending sidewall 52 defines inner circumferential threads 54 that mate with the outer circumferential threads of the vent housing 510.

In the intermediate installation position (not currently depicted), the axially extending sidewall 52 can form the obstruction 550 across the enclosure opening 514 of the vent housing 510, similar to how the outer housing forms the obstruction across the enclosure opening of the inner housing with reference to FIG. 3. In the intermediate installation position, an intermediate installation seal 516 abuts the sidewall 52 of the enclosure 50 to obstruct the fluid flow pathway through the enclosure opening 514. In the intermediate installation position, a first axial length (that is a portion of the full axial length) of the outer circumferential threads 526 of the vent housing 510 can engage the inner circumferential threads 54 of the enclosure 50. In the complete installation position, a second axial length of the outer circumferential threads 526 of the vent housing 510 can engage the inner circumferential threads 54 of the enclosure 50, where the second axial length is greater than the first axial length. The example vent assembly depicted in FIG. 10 can incorporate a translation limiter similar to translation limiters shown and described with reference to FIGS. 1-4, where the translation limiter is manually disengaged to complete installation of the vent assembly 500 in the enclosure.

FIG. 5 is a cross-sectional view of another example vent assembly 200 in an intermediate installation position. The vent assembly 200 can generally be consistent with the discussion above except where noted otherwise herein. The vent assembly 200 has a vent housing 210, a first axial end 202, a second axial end 204, and an airflow pathway 206 extending between the first axial end 202 and the second axial end 204. An environmental opening 212 is defined towards the second axial end 204. The environmental opening 212 is configured for fluid communication between the outside environment and the airflow pathway 206. The vent housing 210 has an enclosure opening 214 configured for selective fluid communication with an interior of an enclosure 20. The enclosure opening 214 selectively defines a fluid flow pathway 207 between an interior of the enclosure 20 and the airflow pathway 206.

The vent housing 210 is generally configured to extend through the wall of an enclosure 20. The vent housing 210 is configured to be coupled to the enclosure 20. The enclosure 20 can be types of enclosures described above with reference to FIGS. 1-4.

Filter media 240 is disposed in the vent housing 210 laterally across the airflow pathway 206. The filter media 240 is generally configured to filter airflow passing through the airflow pathway 206. The filter media 240 can be consistent with filter media described above. In the current example the filter media 240 is arranged in a coiled configuration around a central core 248 that extends in the axial direction. The central core 248 can obstruct fluid flow in the lateral direction to guide fluid flow through the filter media 240 (rather than bypassing the filter media 240). In some embodiments the central core 248 can be omitted. In some implementations, the space between the adjacent layers of coils of filter media 240 may advantageously define flow channels to direct coalesced fluid towards the enclosure opening 214. Such flow channels may have lower resistance to fluid flow in the axial direction than through the filter media 240 itself. Such flow channels can be aligned vertically such that the force of gravity assists in directing the coalesced fluid downward towards the enclosure opening 214. The filter media can have alternate arrangements, such as those described above with reference to FIGS. 1-4.

The vent assembly 200 forms an obstruction 250 that is generally configured to obstruct the enclosure opening 214 in a first relative position and unobstruct the enclosure opening 214 in a second relative position. More particularly, the obstruction 250 is configured to obstruct a fluid flow pathway 207 extending from outside the vent assembly 200 to the airflow pathway 206 in the first relative position, as is depicted in the currently described figure, and clear (or unobstruct) the fluid flow pathway 207 in the second relative position (not currently depicted). In the first relative position, the obstruction 250 is configured to obstruct the portion of the airflow pathway 206 that extends from the outside environment to the filter media 240 via the enclosure opening 214. More particularly, in the first relative position, the obstruction 250 is configured to prevent liquid from passing to the filter media 240 via the enclosure opening 214. Such a configuration may have advantages that have been discussed above.

In this example, in the first relative position, the enclosure opening 214 is disposed between the filter media 240 and the obstruction 250 along the fluid flow pathway 207. The first relative position can be an intermediate installation position where the vent assembly 200 is partially, and not fully, installed in an enclosure 20.

In the second relative position of the obstruction 250 (the "complete" installation position of the vent assembly 200) the obstruction 250 clears the airflow pathway 206 to accommodate venting between the enclosure 20 and the outside environment through the fluid flow pathway 207. More particularly, the obstruction 250 clears the fluid flow pathway 207 to accommodate venting between the enclosure 20 and the outside environment. The obstruction 250 is removed from the fluid flow pathway 207 (and airflow pathway 206) to accommodate fluid flow from the first axial end 202 of the vent housing 210 towards the filter media 240. As such, the environment outside of the vent housing 210 (in particular, the environment within the enclosure 20) and the filter media 240 are brought into fluid communication through the enclosure opening 214 and the fluid flow pathway 207.

In the current example, the vent housing 210 has an inner housing 220 and an outer housing 230 surrounding the inner housing 220. The inner housing 220 and the outer housing 230 have structural and functional similarities with the discussion above relative to FIGS. 1-4. For example, the inner housing 220 is selectively translatable relative to the outer housing 230 and the enclosure 20. More particularly, the inner housing 220 is selectively rotatable and linearly translatable relative to the outer housing 230 and the enclosure 20. The inner housing 220 is selectively translatable relative to the outer housing 230 between the intermediate installation position shown in FIG. 5 and a complete installation position (not currently depicted), which will be discussed in more detail below. In the intermediate installation position, the obstruction 250 is formed across the fluid flow pathway 207. In the complete installation position, the obstruction 250 is clear of the fluid flow pathway 207.

As discussed above with reference to FIGS. 1-4, the outer housing 230 and the inner housing 220 define mating threads 234, 226 that mutually engage to couple the inner housing 220 and the outer housing 230. The outer housing 230 defines inner circumferential threads 234 and the inner housing 220 defines outer circumferential threads 226. The inner housing 220 is rotatable and axially translatable relative to the outer housing 230 via the mating threads 234, 226. In an intermediate installation position, a first axial length a1 that is a portion of the full axial length of the outer circumferential threads 226 of the inner housing 220 can engage the inner circumferential threads 234. The inner housing 220 can be inserted into the outer housing 230 and rotated to engage the first axial length a1 of the outer circumferential threads 226 and the inner circumferential threads 234. Rotation of the inner housing 220 relative to the outer housing 230 advances the inner housing 220 in the axial direction towards the outer housing 230 and towards the inside of the enclosure 20.

Rotation and axial translation of the inner housing 220 relative to the outer housing 230 is permitted until interference by a translation limiter 260 of the vent assembly 200. The translation limiter 260 is configured to prevent further translation of the inner housing 220 relative to the outer housing 230 towards a complete installation position from the intermediate installation position. The translation limiter 260 is configured to obstruct translation of the inner housing 220 relative to the outer housing 230 until manual disengagement of the translation limiter 260. The translation limiter 260 is configured to be manually disengaged to allow a user to complete the installation of the vent assembly 200 by further translating the inner housing 220 relative to the outer housing 230. The translation limiter 260 is consistent with the translation limiters discussed above with reference to FIGS. 1-4.

In the intermediate installation position, the obstruction 250 is in a first relative position where the obstruction 250 obstructs the fluid flow pathway 207. In the current example, the inner housing 220 defines the enclosure opening 214 and the outer housing 230 defines the obstruction 250. Unlike the previously depicted example, in the current example only the outer housing 230 defines the obstruction 250. In various embodiments, the interaction between the inner housing 220 and the outer housing 230 selectively obstructs the fluid flow pathway 207 and clears the fluid flow pathway 207.

In the current example, the obstruction 250 is an openable seal extending laterally across the first axial end 202 of the vent housing 210 in the first relative position. The obstruction 250 extends laterally across the cavity 232 defined by the outer axial sidewall 238 of the outer housing 230. As such, the first axial end 202 of the vent assembly 200 is obstructed from fluid communication with the outside environment. In the current example, the obstruction 250 is an elastomeric seal such as a duckbill valve that is a component of the outer housing 230. In some other embodiments, the openable seal can be a puncturable seal coupled to the first axial end of the outer housing 230. In some embodiments, the puncturable seal is constructed of an elastomeric material having score-lines defined laterally across one or more portions of the puncturable seal.

Similar to the examples discussed above, upon disengagement of the translation limiter 260, the inner housing 220 can be rotated relative to the outer housing 230 to result in axial advancement of the inner housing 220 along the outer housing 230 towards the enclosure 20 to attain a complete installation position. The inner housing 220 is configured to be translated in the axial direction through the obstruction 250 to define the first axial end 202 of the vent housing 210 in the second relative position, similar to the discussion above. In this example, however, as the inner housing 220 is advanced to the complete installation position, the first axial end 221 of the inner housing 220 translates through the obstruction 250 to open the seal (thereby removing the obstruction 250). In such examples, the first axial end 221 of the inner housing 220 is configured to advance in the axial direction through the obstruction 250 to puncture the obstruction 250. In the complete installation position, the first axial end 221 of the inner housing 220 extends through the obstruction 250 to clear the obstruction 250 from the enclosure opening 214 and, therefore, clear the obstruction 250 from the fluid flow pathway 207. In some embodiments at least a portion of the filter media 240 is configured to be positioned within the enclosure 20 when the vent assembly 200 is in a complete installation position, similar to that depicted in FIG. 4.

The outer housing 230 defines the first axial end 202 of the vent housing 210 in the first relative position of the obstruction 250 (the intermediate installation position of the vent assembly 200). Unlike the examples of FIGS. 1-4, in this example, in the intermediate installation position the inner housing 220 does not define the first axial end 202 of the vent housing 210. In the second relative position of the obstruction 250 and the complete installation position of the vent assembly 200, the inner housing 220 defines the first axial end 202 of the vent housing 210 and the outer housing 230 does not define the first axial end 202 of the vent housing 210. In the second relative position of the obstruction (the complete installation position of the vent assembly 200), the inner housing 220 has been translated in the axial direction such that the first axial end 221 of the inner housing 220 advances beyond the first axial end 231 of the outer housing 230 to expose the enclosure opening 214 to the outside environment, which is the inside of the enclosure 20.

As discussed above with reference to FIGS. 1-4, a final installation seal 218 is disposed around the inner axial sidewall 222 of the inner housing 220 towards the second axial end 204 and is consistent with the final installation seal discussed above.

In the current example, the enclosure opening 214 faces the axial direction. In some other embodiments, the enclosure opening 214 faces the lateral direction. The enclosure opening 214 is positioned towards the first axial end 202 of the vent housing 210. More particularly, the enclosure opening 214 partially defines the first axial end 221 of the inner housing 220.

Similar to the examples described above, here the vent assembly 200 has a membrane 242 coupled to the vent housing 210 between the filter media 240 and the second axial end 204. The membrane 242 extends laterally across the airflow pathway 206. In some such embodiments there is a spacing region 244 between the filter media 240 and the membrane 242 that is a gap in the axial direction. The spacing region 244 can include a spacer 246 that is disposed in the axial direction between the membrane 242 and the filter media 240. The spacer 246 can extend laterally across the airflow pathway 206 and can define openings (not currently visible) that partially define the airflow pathway 206.

The vent assembly 200 has a first coupling structure 208 that is configured to sealably engage the enclosure 20 in an intermediate installation position and a second coupling structure 213 that is configured to sealably engage the enclosure 20 in a complete installation position. Discussed above with reference to FIGS. 1-4, the first coupling structure 208 includes screw threading of the outer housing 230 that is configured to mutually engage with mating threads of the enclosure 20. The screw threading is configured to engage the enclosure 20 in the intermediate installation position and the complete installation position. Also in this example, an enclosure sealing surface 209 defined around the outer housing 230 is configured to seal between the enclosure 20 and the vent assembly 200 in the intermediate installation position and the complete installation position.

In some embodiments one or more components of the second coupling structure are configured to be disengaged in the intermediate installation position and configured to be engaged in a complete installation position. For example, a final installation seal 218, a first axial length and a second axial length of the outer circumferential threads 226 of the inner housing 220, and the corresponding inner circumferential threads 234 of the outer housing 230, which are each discussed above with reference to FIGS. 1-4, the disclosure of which applies to the current example.

The axial length of the translation limiter 260 (denoted by element 270) is greater than the axial distance between the obstruction 250 and the enclosure opening 214 (element 272). As such, removal of the translation limiter 260 and the subsequent axial translation of the vent assembly 200 to bring the final installation seal 218 into sealing contact between the inner housing 220 and the outer housing 230 results in clearing the enclosure opening 214 from the obstruction 250.

Figure 6:
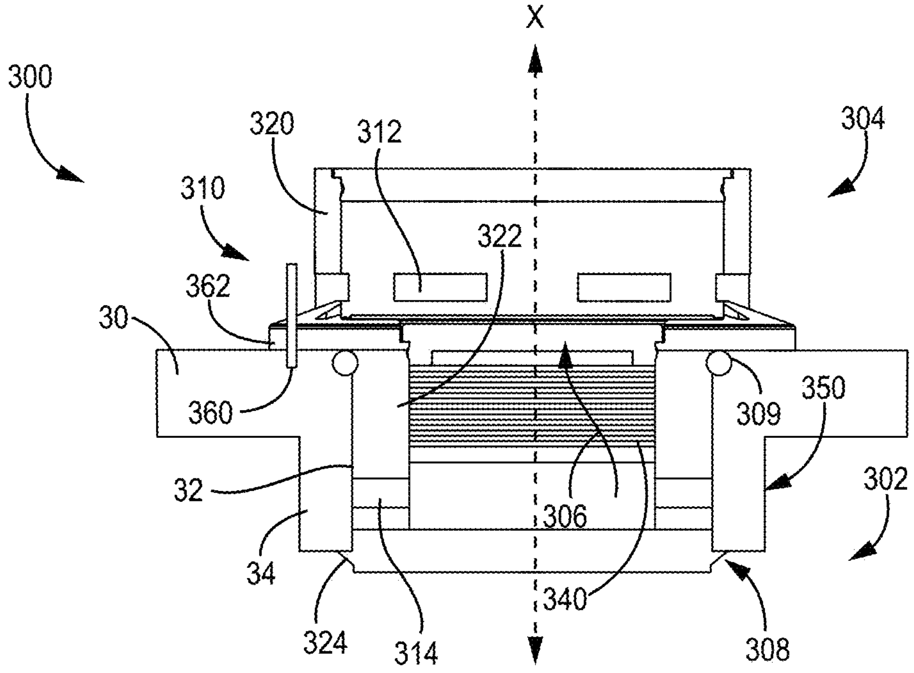
FIG. 6 is a cross-sectional view of yet another example vent assembly in an intermediate installation position.

In the examples shown in FIGS. 1-5, the vent assembly has an inner housing and an outer housing. In some alternate embodiments, the vent lacks an outer housing. FIG. 6 is such an example design, which shows a cross-sectional view of another example vent assembly 300. The vent assembly 300 is depicted in an intermediate installation position where the obstruction 350 is in a first relative position. FIG. 7 is a cross-sectional view of the vent assembly 300 of FIG. 6, where the vent assembly 300 is in a complete installation position where the obstruction 350 is in a second relative position. In the current example, an outer housing is omitted and the vent assembly 300 has an inner housing 320 that is configured to be coupled directly to the enclosure 30 in the intermediate installation position and the complete installation position.

The vent assembly 300 has a vent housing 310, a first axial end 302, a second axial end 304, and an airflow pathway 306 extending between the first axial end 302 and the second axial end 304. An environmental opening 312 is defined towards the second axial end 304. The environmental opening 312 is configured for fluid communication with an outside environment. The environmental opening 312 is configured for fluid communication between the outside environment and the airflow pathway 306. The vent housing 310 defines an enclosure opening 314. The enclosure opening 314 is generally configured for selective fluid communication with an interior of an enclosure 30. The enclosure opening 314 is configured to selectively define a fluid flow pathway 307 between an interior of the enclosure 30 and the airflow pathway 306.

Filter media 340 is disposed in the vent housing 310 laterally across the airflow pathway 306, where the filter media 340 is configured to filter airflow passing through the airflow pathway 306. In the current example, the filter media 340 is an axial stack of filter media 340, but the filter media 340 can be consistent with other filter medias described above. In some embodiments the vent assembly 300 also has a membrane 342 coupled to the vent housing 310 between the filter media 340 and the second axial end 304. The membrane 342 extends laterally across the airflow pathway 306. In some such embodiments there is a spacing region between the filter media 340 and the membrane 342 that is a gap in the axial direction. Some embodiments may omit a membrane, however.

The vent housing 310 is generally configured to extend through a wall of an enclosure 30. The vent housing 310 is generally configured to be coupled to the enclosure 30. More particularly, the vent housing 310 has a first coupling structure 308 that is configured to sealably engage the enclosure 30 at least in an intermediate installation position. In the current example, the first coupling structure 308 is configured to sealably engage the enclosure 30 in the complete installation position. In the current example, the first coupling structure 308 includes a snap fit connector, although alternate or additional coupling structures can be used, examples of which have been described above. More particularly, the enclosure 30 defines an opening 32 and an axial sidewall 34 extending into the enclosure 30 that surrounds the opening 32. The vent housing 310 has an axially extending sidewall 322 surrounding the airflow pathway 306 that is configured to be received by the axial wall 34 of the enclosure 30. The first coupling structure 308 includes a retaining rim 324 that extends radially outward from a distal end of the axial sidewall 34 to create an interference fit between the vent housing 310 and the enclosure 30. The retaining rim 324 can be constructed of a variety of different materials. In some embodiments the retaining rim 324 is an elastomeric material. In another embodiment the retaining rim is plastic.

In examples the first coupling structure 308 can also include an enclosure sealing surface 309 that is configured to form a seal between the enclosure 30 and the vent assembly 300 in the intermediate installation position. As such, the enclosure sealing surface 309 can be considered an intermediate installation seal. The enclosure sealing surface 309 surrounds the opening of the enclosure 30 and is positioned axially between the enclosure 30 and the vent housing 310. In some embodiments the enclosure sealing surface 309 is positioned radially between the enclosure 30 and the vent housing 310.

In the current example, the first coupling structure 308 sealably couples the vent housing 310 to the enclosure 30 in the intermediate installation position and the complete installation position. In the current example, as mentioned above, the vent housing 310 lacks an outer housing surrounding an inner housing. Rather, in the current example, the vent housing 310 is a single housing that is directly coupled to the enclosure 30.

The vent assembly 300 forms an obstruction 350 that is configured to obstruct the fluid flow pathway 307 in the first relative position and unobstruct the fluid flow pathway 307 in the second relative position. The first relative position of the obstruction is consistent with the intermediate installation position of the vent assembly 300. In the first relative position, the obstruction 350 is configured to extend across the enclosure opening 314. The obstruction 350 is configured to prevent liquid from passing to the filter media 340 from the enclosure opening 314. In this example, the enclosure opening 314 is disposed between the filter media 340 and the obstruction 350 along the fluid flow pathway 307 in the first relative position. The obstruction 350 directly obstructs the enclosure opening 314 in the current example, meaning that the obstruction 350 makes sealing contact with the vent housing 310 around each of the enclosure openings 314.

In the second relative position of the obstruction 350, which is the complete installation position depicted in FIG. 7, the obstruction 350 clears the fluid flow pathway 307 to accommodate venting between the enclosure 30 and the outside environment. The obstruction 350 is configured to be removed from the fluid flow pathway 307 to accommodate fluid flow from the first axial end 302 of the vent housing 310 towards the filter media 340. As such, the environment within the enclosure 30 and the filter media 340 are brought into fluid communication through the enclosure opening 314. In various implementations, the vent assembly 300 is configured to remain in an upright orientation upon achieving a complete installation position (when the obstruction is in the second relative position).

In the current example depicted, the vent housing 310 and the enclosure 30 collectively define the obstruction 350. More particularly, the axially extending sidewall 322 of the vent housing 310 defines a plurality of enclosure openings 314 that are spaced circumferentially around the axially extending sidewall 322. The axially extending sidewall 322 is configured to abut the axial sidewall 34 of the enclosure 30. The axial sidewall 34 defines a plurality of corresponding openings 36 (FIG. 7) that are circumferentially spaced around the axial wall 34. The corresponding openings 36 are configured to overlap with the enclosure openings 314 in the radial direction in the complete installation position. In the complete installation position the obstruction 350 is in the second relative position that is the complete installation position of the vent assembly 300. Further, the corresponding openings 36 (visible in FIG. 7) of the enclosure 30 do not align with the enclosure openings 314 when the obstruction 350 is in the first relative position, which is the intermediate installation position of the vent assembly 300 (FIG. 6). More particularly, the obstruction 350 includes the axial sidewall 34 of the enclosure 30 that extends across each of the enclosure openings 314 of the vent housing 310 and the axially extending sidewall 322 of the vent housing 310 that extends across each of the corresponding openings 36 of the axial wall 34 of the enclosure in the intermediate installation position of the vent assembly 300.

The inner housing 320 is rotatably disposed in the enclosure 30 and is configured to be rotated relative to the enclosure 30 from the intermediate installation position where the enclosure opening 314 and the corresponding opening 36 do not align to a completed installation position where the enclosure opening 314 and the corresponding opening 36 are aligned to form the fluid flow pathway 307 extending from the interior of the enclosure 30 to the filter media 340.

Similar to discussions above, the vent housing 310 is configured to be selectively rotatable relative to the enclosure 30. The vent housing 310 can be selectively translatable between the intermediate installation position (FIG. 6), and the complete installation position (FIG. 7). In the intermediate installation position, the obstruction 350 is formed across the fluid flow pathway 307 as discussed above. In the complete installation position, the obstruction 350 is clear of the fluid flow pathway 307 as discussed above.

In various embodiments a translation limiter 360 is configured to obstruct translation of the vent housing 310 relative to the enclosure 30 in the intermediate installation position until manual disengagement. The translation limiter 360 disengageably engages the inner housing 320 and the enclosure 30. The translation limiter 360 is configured to be manually disengaged to translate the vent housing 310 from the intermediate installation position to the complete installation position of the vent assembly 300. In the current example, the inner housing 320 is rotatable relative to the enclosure 30 to define the first relative position (FIG. 6) and the second relative position (FIG. 7) of the obstruction 350. The translation limiter 360 is configured to prevent rotational translation of the inner housing 320 relative to the enclosure 30 until manual disengagement of the translation limiter 360.

In the current example, the translation limiter 360 is a pin that prevents rotation of the vent housing 310 relative to the enclosure 30. The pin is configured to extend through a pin receptacle 362 mutually defined by the vent housing 310 and the enclosure 30. The pin can be configured to be manually removed to enable translation of the vent housing 310 for complete installation of the vent assembly 300. The translation limiter can have alternate configurations, some of which have been described above.

In the current example, the enclosure opening 314 faces the lateral direction. The enclosure opening 314 is positioned towards the first axial end 302 of the vent housing 310.

Figure 8:
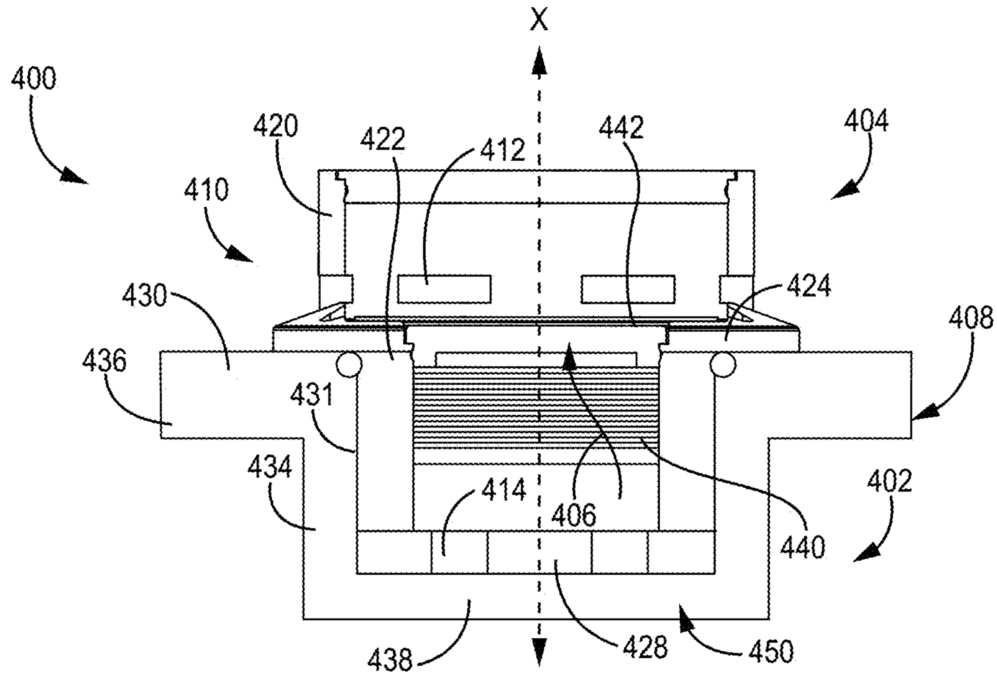
FIG. 8 is a cross-sectional view of yet another example vent assembly in an intermediate installation position.

FIG. 8 is a cross-sectional view of yet another example vent assembly 400. In this example the vent assembly 400 has an inner housing 420 and an outer housing 430. The vent assembly 400 is depicted in an intermediate installation position where the obstruction 450 is in a first relative position. FIG. 9 is a cross-sectional view of the vent assembly 400 of FIG. 8, where the vent assembly 400 is in a complete installation position where the obstruction 450 is in a second relative position.

As with other examples described, the vent assembly 400 has a vent housing 410, a first axial end 402, a second axial end 404, and an airflow pathway 406 extending between the first axial end 402 and the second axial end 404. An environmental opening 412 is defined towards the second axial end 404. The environmental opening 412 is configured for fluid communication with an outside environment. The environmental opening 412 is configured for fluid communication between the outside environment and the airflow pathway 406. The vent housing 410 defines an enclosure opening 414. The enclosure opening 414 is generally configured for selective fluid communication with an interior of an enclosure. The enclosure opening 414 is configured to selectively define a fluid flow pathway 407 between an interior of the enclosure and the airflow pathway 406.

Filter media 440 is disposed in the vent housing 410 laterally across the airflow pathway 406, where the filter media 440 is configured to filter airflow passing through the airflow pathway 406. In the current example, the filter media 440 is an axial stack of filter media 440, but the filter media 440 can be consistent with other filter medias described above. In some embodiments the vent assembly 400 also has a membrane 442 coupled to the vent housing 410 between the filter media 440 and the second axial end 404. The membrane 442 extends laterally across the airflow pathway 406. In some such embodiments there is a spacing region between the filter media 440 and the membrane 442 that is a gap in the axial direction. Some embodiments may omit a membrane, however.

The vent housing 410 is generally configured to extend through a wall of an enclosure (not currently depicted). The vent housing 410 is generally configured to be coupled to the enclosure. More particularly, the vent housing 410 has a first coupling structure 408 that is configured to sealably engage the enclosure at least in an intermediate installation position. In the current example, the first coupling structure 408 is configured to sealably engage the enclosure in the complete installation position. In the current example, the outer housing 430 has the first coupling structure 408 that is configured to be sealably coupled to the enclosure wall about an opening defined in the enclosure wall. More particularly, the outer housing 430 has an outer axial sidewall 434 and a first retaining rim 436 extending radially outward from the outer axial sidewall 434. The outer axial sidewall 434 is configured to extend through the opening defined by the enclosure wall and the first retaining rim 436 is configured to abut the enclosure wall. The first retaining rim 436 can be configured to be coupled to the enclosure wall through welding, adhesive, fasteners, or through other approaches discussed above. In some embodiments the outer axial sidewall 434 can define bayonet connectors, snap-fit features, or other coupling structures that are configured to mate with the enclosure.

The outer axial sidewall 434 and the first retaining rim 436 defines an inner housing opening 431. Each of the outer axial sidewall 434 and the first retaining rim 436 surrounds the inner housing opening 431. The outer axial sidewall 434 is configured to extend axially into a corresponding enclosure. The vent housing 410 has an inner housing 420 having an inner axial sidewall 422 surrounding the airflow pathway 406. The inner axial sidewall 422 is configured to be received by the outer housing 430. The first coupling structure 408 can include a circumferential retaining rim 424 that extends radially between the inner housing 420 and the outer housing 430. The circumferential retaining rim 424 can fix the inner housing 420 to the outer housing 430 in the axial direction but allow relative rotation between the inner housing 420 and the outer housing 430. The circumferential retaining rim 424 can define a seal between the outer housing 430 and the inner housing 420 in the intermediate installation position (FIG. 8). In various embodiments, the circumferential retaining rim 424 can define a seal between the outer housing 430 and the inner housing 420 in the complete installation position (FIG. 9).

The vent assembly 400 forms an obstruction 450 that is configured to obstruct the fluid flow pathway 407 in the first relative position and unobstruct the fluid flow pathway 407 in the second relative position. The first relative position of the obstruction is consistent with the intermediate installation position of the vent assembly 400. In the first relative position, the obstruction 450 is configured to extend across the enclosure opening 414. The obstruction 450 is configured to prevent liquid from passing to the filter media 440 from the enclosure opening 414. In this example, the enclosure opening 414 is disposed between the filter media 440 and the obstruction 450 along the fluid flow pathway 407 in the first relative position. The obstruction 450 directly obstructs the enclosure opening 414 in the current example, meaning that the obstruction 450 makes sealing contact with the vent housing 410 around each of the enclosure openings 414.

In the second relative position of the obstruction 450, which is the complete installation position depicted in FIG. 9, the obstruction 450 clears the fluid flow pathway 407 to accommodate venting between the enclosure and the outside environment. The obstruction 450 is configured to be removed from the fluid flow pathway 407 to accommodate fluid flow from the first axial end 402 of the vent housing 410 towards the filter media 440. As such, the environment within the enclosure and the filter media 440 are brought into fluid communication through the enclosure opening 414. In various implementations, the vent assembly 400 is configured to remain in an upright orientation upon achieving a complete installation position (when the obstruction is in the second relative position).

Similar to the examples described above with reference to FIGS. 6-7, in this example, the vent housing 410 is configured to be rotated between the intermediate installation position and the complete installation position. In the current example depicted however, the inner housing 420 and the outer housing 430 collectively define the obstruction 450. More particularly, the inner housing 420 defines a first lateral end wall 428 extending across the distal end of the inner axial sidewall 422. The first lateral end wall 428 defines a plurality of enclosure openings 414 facing the axial direction. The outer housing 430 defines a second lateral end wall 438 extending across the distal end of the outer axial sidewall 434. The second lateral end wall 438 defines a plurality of corresponding openings 432 (FIG. 9). The first lateral end wall 428 and the second lateral end wall 438 mutually define the obstruction 450. The corresponding openings 432 are configured to overlap with the enclosure openings 414 in the axial direction in the complete installation position to clear the fluid flow pathway 307. In the complete installation position the obstruction 450 is referred to as being in the second relative position that is the complete installation position of the vent assembly 400.

When the obstruction 450 is in the first relative position, which is the intermediate installation position of the vent assembly 400 (FIG. 8) the corresponding openings 432 of the outer housing 430 do not align with the enclosure openings 414. More particularly, the obstruction 450 includes the second lateral end wall 438 of the enclosure that extends laterally across each of the enclosure openings 414 of the inner housing 420 and the first lateral end wall 428 of the vent housing 410 that extends across each of the corresponding openings 432 of second lateral end wall 438 of the enclosure in the intermediate installation position of the vent assembly 400.

The inner housing 420 is rotatably disposed in the outer housing 430 and is configured to be rotated relative to the enclosure from the intermediate installation position where the enclosure openings 414 and the corresponding openings 432 do not align in the axial direction to a completed installation position where the enclosure openings 414 and the corresponding openings 432 are aligned in the axial direction to form the fluid flow pathway 407 extending from the interior of the enclosure to the filter media 440. While a plurality of enclosure openings 414 and corresponding openings 432 are currently depicted, in some other embodiments a single enclosure opening and corresponding opening can be used.

Similar to discussions above, the inner housing 420 is configured to be selectively rotatable relative to outer housing 430 and a corresponding enclosure. The vent housing 410 can be selectively translatable between the intermediate installation position (FIG. 8), and the complete installation position (FIG. 9). In the intermediate installation position, the obstruction 450 is formed across the fluid flow pathway 407 as discussed above. In the complete installation position, the obstruction 450 is clear of the fluid flow pathway 407 as discussed above.

While a translation limiter is not currently depicted, it will be appreciated that a translation limiter can be incorporated in the vent assembly 400 to maintain the vent assembly 400 in an intermediate installation position until manually disengaged. The translation limiter can be configured to obstruct translation of the inner housing 420 relative to the outer housing 430 in the intermediate installation position until manual disengagement. In the current example, the translation limiter would be configured to prevent rotational translation of the inner housing 420 relative to the outer housing 430 until manual disengagement of the translation limiter, at which point the inner housing 420 is rotated relative to the outer housing 430 to define the fluid flow pathway 407.

EXEMPLARY ASPECTS

Aspect 1. A vent assembly comprising:
- a vent housing having:
  - a first axial end, a second axial end, and an airflow pathway extending between the first axial end and the second axial end,
  - an environmental opening towards the second axial end configured for fluid communication between an outside environment and the airflow pathway,
  - an enclosure opening configured to selectively define a fluid flow pathway between an interior of an enclosure and the airflow pathway;
- an obstruction having a first relative position and a second relative position, wherein the obstruction is configured to obstruct the fluid flow pathway in the first relative position and unobstruct the fluid flow pathway in the second relative position; and filter media disposed in the vent housing laterally across the airflow pathway.

Aspect 2. The vent assembly of any one of aspects 1 and 3-27, the vent housing comprising an inner housing and an outer housing surrounding the inner housing, wherein the inner housing is translatable relative to the outer housing.

Aspect 3. The vent assembly of any one of aspects 1-2 and 4-27, wherein the inner housing defines the enclosure opening.

Aspect 4. The vent assembly of any one of aspects 1-3 and 5-27, wherein the inner housing defines the obstruction.

Aspect 5. The vent assembly of any one of aspects 1-4 and 6-27, wherein the outer housing defines the obstruction.

Aspect 6. The vent assembly of any one of aspects 1-5 and 7-27, wherein the outer housing further defines a corresponding opening that aligns with the enclosure opening when the obstruction is in the second relative position and the corresponding opening does not align with the enclosure opening when the obstruction is in the first relative position.

Aspect 7. The vent assembly of any one of aspects 1-6 and 8-27, wherein the inner housing is rotatable relative to the outer housing to define the first relative position and the second relative position of the obstruction.

Aspect 8. The vent assembly of any one of aspects 1-7 and 9-27, wherein the inner housing is axially translatable relative to the outer housing to define the first relative position and the second relative position of the obstruction.

Aspect 9. The vent assembly of any one of aspects 1-8 and 10-27, further comprising a translation limiter disengageably engaging the inner housing and the outer housing, wherein the translation limiter is configured to obstruct translation of the inner housing relative to the outer housing until manual disengagement.

Aspect 10. The vent assembly of any one of aspects 1-9 and 11-27, wherein the translation limiter is a manually removable clip.

Aspect 11. The vent assembly of any one of aspects 1-10 and 12-27, wherein the translation limiter is a visually distinctive color relative to the visible portions of the non-translation limiter components of the vent assembly.

Aspect 12. The vent assembly of any one of aspects 1-11 and 13-27, wherein the outer housing defines the first axial end of the housing in the first relative position of the obstruction, and the inner housing defines the first axial end of the housing in the second relative position of the obstruction.

Aspect 13. The vent assembly of any one of aspects 1-12 and 14-27, wherein the outer housing comprises an openable seal defining the obstruction, wherein the openable seal extends laterally across the first axial end of the vent housing in the first relative position, and the inner housing is configured to extend through the openable seal to define the first axial end of the vent housing in the second relative position.

Aspect 14. The vent assembly of any one of aspects 1-13 and 15-27, wherein the outer housing comprises a duckbill valve.

Aspect 15. The vent assembly of any one of aspects 1-14 and 16-27, wherein the vent housing comprises an axially extending sidewall surrounding the airflow pathway, wherein the vent assembly further comprises an intermediate installation seal disposed around the sidewall towards the first axial end and a final installation seal disposed around the sidewall towards the second axial end.

Aspect 16. The vent assembly of any one of aspects 1-15 and 17-27, wherein the intermediate installation seal is positioned between the enclosure opening and the first axial end.

Aspect 17. The vent assembly of any one of aspects 1-16 and 18-27, wherein the intermediate installation seal is disposed around the inner housing.

Aspect 18. The vent assembly of any one of aspects 1-17 and 19-27, wherein the outer housing comprises a seal retainer, wherein the intermediate installation seal is outside the seal retainer in the first relative position and the intermediate installation seal is within the seal retainer in the second relative position.

Aspect 19. The vent assembly of any one of aspects 1-18 and 20-27, wherein the intermediate installation seal defines the obstruction.

Aspect 20. The vent assembly of any one of aspects 1-19 and 21-27, wherein the intermediate installation seal is configured to abut the enclosure in the first relative position and is spaced from the enclosure in the second relative position.

Aspect 21. The vent assembly of any one of aspects 1-20 and 22-27, wherein the enclosure opening faces the axial direction.

Aspect 22. The vent assembly of any one of aspects 1-21 and 23-27, wherein the enclosure opening faces the lateral direction.

Aspect 23. The vent assembly of any one of aspects 1-22 and 24-27, wherein the enclosure opening is positioned towards the first axial end.

Aspect 24. The vent assembly of any one of aspects 1-23 and 25-27, further comprising a membrane coupled to the vent housing between the filter media and the second axial end, wherein the membrane extends laterally across the airflow pathway.

Aspect 25. The vent assembly of any one of aspects 1-24 and 26-27, further comprising a spacing region between the filter media and the membrane.

Aspect 26. The vent assembly of any one of aspects 1-25 and 27, wherein the filter media comprises coalescing filter media.

Aspect 27. The vent assembly of any one of aspects 1-26, wherein the filter media comprises at least 10 sheets of filter media arranged in a stack in the axial direction.

Aspect 28. A vent assembly comprising:

a vent housing configured to extend through an enclosure having a wall thickness, the vent housing having:

a first axial end, a second axial end, and an airflow pathway extending between the first axial end and the second axial end, an environmental opening towards the second axial end configured for fluid communication between an outside environment and the airflow pathway, and an enclosure opening configured to selectively define a fluid flow pathway between an interior of the enclosure and the airflow pathway;

a first coupling structure configured to sealably engage the enclosure in an intermediate installation position;

a translation limiter configured to obstruct translation of the vent housing relative to the enclosure in the intermediate installation position, wherein the translation limiter is configured to be manually disengaged; and filter media disposed in the housing laterally across the airflow pathway.

Aspect 29. The vent assembly of any one of aspects 28 and 30-43, wherein the enclosure opening faces the lateral direction.

Aspect 30. The vent assembly of any one of aspects 28-29 and 31-43, further comprising an intermediate installation seal disposed around the vent housing, wherein the intermediate installation seal is positioned between the enclosure opening and the first axial end.

Aspect 31. The vent assembly of any one of aspects 28-30 and 32-43, wherein the translation limiter is a visually distinctive color relative to the visible portions of the non-translation limiter components of the vent assembly.

Aspect 32. The vent assembly of any one of aspects 28-31 and 33-43, wherein the translation limiter is configured to obstruct translation of the vent housing in the axial direction.

Aspect 33. The vent assembly of any one of aspects 28-32 and 34-43, an enclosure sealing surface disposed around the vent housing, wherein the enclosure sealing surface is positioned axially between the second axial end and the enclosure opening and is configured to form a seal with the enclosure in the intermediate installation position.

Aspect 34. The vent assembly of any one of aspects 28-33 and 35-43, wherein the translation limiter is positioned axially between the enclosure sealing surface and the environmental opening.

Aspect 35. The vent assembly of any one of aspects 28-34 and 36-43, wherein the axial distance between the intermediate installation seal and the translation limiter is greater than the axial distance between the enclosure sealing surface and the enclosure opening.

Aspect 36. The vent assembly of any one of aspects 28-35 and 37-43, further comprising engagement threads around the vent housing extending from the enclosure sealing surface towards the intermediate installation seal, wherein the axial distance across the engagement threads is greater than the axial distance between the intermediate installation seal and the enclosure opening.

Aspect 37. The vent assembly of any one of aspects 28-36 and 38-43, further comprising a snap fit connector configured to engage an enclosure via an interference fit.

Aspect 38. The vent assembly of any one of aspects 28-37 and 39-43, wherein the axial distance between the intermediate installation seal and the enclosure opening is configured to be less than the wall thickness of the enclosure.

Aspect 39. The vent assembly of any one of aspects 28-38 and 40-43, where the translation limiter is configured to prevent rotation of the vent housing relative to an enclosure.

Aspect 40. The vent assembly of any one of aspects 28-39 and 41-43, wherein the enclosure opening faces the axial direction.

Aspect 41. The vent assembly of any one of aspects 28-40 and 42-43, wherein the filter media is configured to be positioned within the enclosure.

Aspect 42. The vent assembly of any one of aspects 28-41 and 43, further comprising a second coupling structure configured to be disengaged from the enclosure in the intermediate installation position and configured to sealably engage the enclosure in a complete installation position.

Aspect 43. The vent assembly of any one of aspects 28-42, further comprising an obstruction, wherein the obstruction is configured to obstruct the fluid flow pathway in the intermediate installation position and unobstruct the fluid flow pathway in the complete installation position.

It should also be noted that, as used in this specification and the appended claims, the phrase “configured” describes a system, apparatus, or other structure that is constructed to perform a particular task or adopt a particular configuration. The word “configured” can be used interchangeably with similar words such as “arranged”, “constructed”, “manufactured”, and the like.

All publications and patent applications in this specification are indicative of the level of ordinary skill in the art to which this technology pertains. All publications and patent applications are herein incorporated by reference to the same extent as if each individual publication or patent application was specifically and individually indicated by reference. In the event that any inconsistency exists between the disclosure of the present application and the disclosure(s) of any document incorporated herein by reference, the disclosure of the present application shall govern.

This application is intended to cover adaptations or variations of the present subject matter. It is to be understood that the above description is intended to be illustrative, and not restrictive, and the claims are not limited to the illustrative embodiments as set forth herein.

What is claimed is:

1. A vent assembly comprising:

a vent housing comprising an inner housing and an outer housing surrounding the inner housing, wherein the inner housing is translatable relative to the outer housing, the vent housing having:

a first axial end, a second axial end, and an airflow pathway extending between the first axial end and the second axial end, an environmental opening towards the second axial end configured for fluid communication between an outside environment and the airflow pathway, an enclosure opening configured to selectively define a fluid flow pathway between an interior of an enclosure and the airflow pathway, and an obstruction having a first relative position and a second relative position, wherein the obstruction is configured to obstruct the fluid flow pathway in the first relative position and unobstruct the fluid flow pathway in the second relative position; and filter media disposed in the vent housing laterally across the airflow pathway.

2. The vent assembly of claim 1, wherein the inner housing defines the enclosure opening.

3. The vent assembly of claim 1, wherein the outer housing further defines a corresponding opening that aligns with the enclosure opening when the obstruction is in the second relative position and the corresponding opening does not align with the enclosure opening when the obstruction is in the first relative position.

4. The vent assembly of claim 1, wherein the inner housing is axially translatable relative to the outer housing to define the first relative position and the second relative position of the obstruction.

5. The vent assembly of claim 1, further comprising a translation limiter disengageably engaging the inner housing and the outer housing, wherein the translation limiter is configured to obstruct translation of the inner housing relative to the outer housing until manual disengagement.

6. The vent assembly of claim 1, wherein the vent housing comprises an axially extending sidewall surrounding the airflow pathway, wherein the vent assembly further comprises an intermediate installation seal disposed around the sidewall towards the first axial end and a final installation seal disposed around the sidewall towards the second axial end.

7. The vent assembly of claim 6, wherein the intermediate installation seal is positioned between the enclosure opening and the first axial end.

8. The vent assembly of claim 6, wherein the outer housing comprises a seal retainer, wherein the intermediate installation seal is outside the seal retainer in the first relative position and the intermediate installation seal is within the seal retainer in the second relative position.

9. The vent assembly of claim 6, wherein the intermediate installation seal defines the obstruction.

10. The vent assembly of claim 1, wherein the enclosure opening faces the lateral direction.

11. The vent assembly of claim 1, further comprising a membrane coupled to the vent housing between the filter media and the second axial end, wherein the membrane extends laterally across the airflow pathway.

12. The vent assembly of claim 1, wherein the filter media comprises coalescing filter media.

13. A vent assembly comprising:

a vent housing configured to extend through an enclosure having a wall thickness, the vent housing having:

a first axial end, a second axial end, and an airflow pathway extending between the first axial end and the second axial end, an environmental opening towards the second axial end configured for fluid communication between an outside environment and the airflow pathway, and an enclosure opening configured to selectively define a fluid flow pathway between an interior of the enclosure and the airflow pathway;

a first coupling structure configured to sealably engage the enclosure in an intermediate installation position;

a translation limiter configured to obstruct translation of the vent housing relative to the enclosure in the intermediate installation position, wherein the translation limiter is configured to be manually disengaged to allow translation of the vent housing relative to the enclosure to a complete installation position; and filter media disposed in the housing laterally across the airflow pathway.

14. The vent assembly of claim 13, further comprising an intermediate installation seal disposed around the vent housing, wherein the intermediate installation seal is positioned between the enclosure opening and the first axial end.

15. The vent assembly of claim 13, wherein the translation limiter is a visually distinctive color relative to the visible portions of the non-translation limiter components of the vent assembly.

16. The vent assembly of claim 13, wherein the translation limiter is configured to obstruct translation of the vent housing in the axial direction.

17. The vent assembly of claim 13, further comprising an enclosure sealing surface disposed around the vent housing, wherein the enclosure sealing surface is positioned axially between the second axial end and the enclosure opening and the enclosure sealing surface is configured to form a seal with the enclosure in the intermediate installation position.

18. The vent assembly of claim 13, further comprising a second coupling structure configured to be disengaged from the enclosure in the intermediate installation position and configured to sealably engage the enclosure in the complete installation position.

19. The vent assembly of claim 18, further comprising an obstruction, wherein the obstruction is configured to obstruct the fluid flow pathway in the intermediate installation position and unobstruct the fluid flow pathway in the complete installation position.

* * * * *